(12) United States Patent
Culpin et al.

(10) Patent No.: US 12,103,404 B2
(45) Date of Patent: *Oct. 1, 2024

(54) ELECTRICAL FAULT ISOLATION IN A POWER DISTRIBUTION NETWORK OF AN AIRCRAFT

(71) Applicant: Lilium eAircraft GmbH, Wessling (DE)

(72) Inventors: Ed Culpin, Munich (DE); Martin Angerer, Gilching (DE)

(73) Assignee: Lilium eAircraft GmbH, Wessling (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/216,227

(22) Filed: Jun. 29, 2023

(65) Prior Publication Data

US 2023/0391200 A1    Dec. 7, 2023

Related U.S. Application Data

(63) Continuation of application No. 17/747,661, filed on May 18, 2022, now Pat. No. 11,724,600.

(51) Int. Cl.
    *B60L 3/04*        (2006.01)
    *B64C 29/00*      (2006.01)
    (Continued)

(52) U.S. Cl.
    CPC .......... *B60L 3/04* (2013.01); *B64C 29/0033* (2013.01); *B64C 39/12* (2013.01); *B64D 27/24* (2013.01); *B60L 2200/10* (2013.01)

(58) Field of Classification Search
None
See application file for complete search history.

(56) References Cited

U.S. PATENT DOCUMENTS

2015/0102662 A1*   4/2015   Walstrom ................. H02J 4/00
                                                                      307/9.1
2015/0103458 A1    4/2015   Liffring et al.
(Continued)

FOREIGN PATENT DOCUMENTS

CN         108688803 A    10/2018
EP           3624301 A1     3/2020
WO     2019006469 A1     1/2019

OTHER PUBLICATIONS

International Search Report and Written Opinion issued for Application No. PCT/EP2022/062636, dated Aug. 22, 2022.

(Continued)

*Primary Examiner* — Jared Fureman
*Assistant Examiner* — Aqeel H Bukhari
(74) *Attorney, Agent, or Firm* — Meunier Carlin & Curfman LLC

(57) ABSTRACT

An electrical power distribution network of an electric power system of an aircraft is operated in at least one normal operation mode such that it provides for load sharing across electrical power sources (A, B, C, D) with respect to electrical loads (AA, BB, CC, DD), wherein the electrical power distribution network, in case of an electrical fault, is operated in at least one electrical failure mitigating operation mode, which provides for electric fault isolation, such that a network portion of the electrical power distribution network including the electrical fault is isolated from at least one other network portion of the of the electrical power distribution network.

14 Claims, 9 Drawing Sheets

(51) Int. Cl.
*B64C 39/12* (2006.01)
*B64D 27/24* (2024.01)

(56) References Cited

U.S. PATENT DOCUMENTS

| | | |
|---|---|---|
| 2019/0212383 A1 | 7/2019 | Elliott |
| 2019/0315480 A1 | 10/2019 | Alan et al. |
| 2020/0079520 A1 | 3/2020 | Demizu et al. |
| 2020/0164995 A1 | 5/2020 | Lovering et al. |

OTHER PUBLICATIONS

European Search Report for EP 21174719.1, Nov. 11, 2021. 19 pages.

\* cited by examiner

ELECTRICAL FAULT ISOLATION IN A POWER DISTRIBUTION NETWORK OF AN AIRCRAFT

CROSS REFERENCE TO RELATED APPLICATION

This application is a continuation of pending U.S. application Ser. No. 17/747,661 filed May 18, 2022, which is fully incorporated by reference, and which claims priority to European Patent Office application EP 21174719.1 filed May 19, 2021.

TECHNICAL FIELD

The present invention generally relates to an electrical power system for an aircraft, and to an aircraft, that has such an electrical power system. For example, the aircraft may be an aircraft of the canard type having multiple lift/thrust units distributed along the front or canard wings and along the aft or main wings. The electrical power system comprises a plurality of electrical loads, such as at least one of multiple lift/thrust units and multiple flap actuators, a plurality of electrical power sources, such as multiple storage batteries or battery units, and an electrical power distribution network configured to connect the electrical power sources with the electrical loads, such that each electrical load can be driven by at least one associated electrical power source via at least one associated power lane of the electrical power distribution network. The present invention further relates to a method for operating an electrical power system of an aircraft.

BACKGROUND

Aircrafts maybe generally classified into fixed wing and rotating wing types. Fixed wing aircrafts typically include a plurality of flight control surfaces that, when controllably positioned, guide the movement of the aircraft from one destination to another destination. The number and type of flight control surfaces included in an aircraft may vary. Primary flight control surfaces are typically those that are used for control the aircraft movement with respect to the pitch, yaw and roll axes. Secondary flight control surface are typically those that are used to influence the lift or drag (or both) of the aircraft. Typical primary flight control surfaces include elevators, ailerons and rudder, and typical secondary flight control surfaces include a plurality of flaps, slats, speed brakes and spoilers.

Rotary-wing aircraft, such as e.g. helicopters, typically do not have flight control surfaces that are separated from the airfoils that produce lift, but the airfoils that constitute the rotating wing have a cyclic control for pitch and roll, and a collective control for lift.

Further, aircrafts are known, which have a vertical take-off and landing capability based on propulsion engines, which are mounted rotatably with respect to a transvers axis or pitch axis of the aircraft. The propulsion engines are controllably movable between a cruising flight position and a take-off/landing position. In the cruising position the engines provide forward thrust and the movement of the aircraft through the air is controlled by means of suitable flight control surfaces. In the take-off/landing position, the propulsion engines are angled downwards for allowing a vertical take-off or landing based on the thrust provided by the engines.

Such types of aircraft with vertical take-off and landing capability and having electrically driven ducted propellers as propulsion engines have been proposed by the present applicant Lilium eAircraft GmbH according to the publications US 2016/0023754 A1 and US 2016/0311522 A1 and further publications of the same patent families. The present applicant meanwhile has developed an aircraft denoted as Lilium jet, which is a canard type aircraft and has plural left front engines, plural right front engines, plural left aft engines and plural right aft engines in the form of ducted propellers operated electrically, which are mounted to respective flaps of the front left and right canard wing and the left and right aft or main wing of the canard type aircraft. The first test flight of this Lilium jet was performed on Oct. 1, 2019.

Another type of an aircraft with vertical take-off and landing capability and operated electrically is known from US 2020/0010187 A1. The aircraft has a plurality of propulsion assemblies each comprising an electric motor having two independent windings, so that the electric motor is of a dual supply type. Plural storage battery units are associated pairwise to the electrical motors, such that a first winding of each electric motor can be driven based on one of the storage battery units and that a second winding of each electric motor can be driven based on another of the storage battery units. Various electrical power system architectures aiming to achieve fault tolerance are disclosed. According to a first embodiment, six electric motors and six storage battery units are arranged in a ring architecture so that each storage battery unit powers two electric motors and each electric motor receives power from two battery units. According to a second embodiment, six electric motors and four storage battery units are arranged in a doublet architecture, so that each storage battery unit powers three electric motors and each electric motor receives power from two battery units. According to third embodiment, six electric motors and six storage battery units are arranged in a hexagram architecture so that each storage battery unit powers two electric motors and each electric motor receives power from two battery units. According to a fourth embodiment, six electric motors and four storage battery units are arranged in a star architecture, so that each storage battery unit powers three electric motors and each electric motor receives power from two battery units. According to a fifth embodiment, six electric motors and four storage battery units are arranged in a star architecture, so that each storage battery unit powers three electric motors and each electric motor receives power from two battery units. According to a sixth embodiment, six electric motors and four storage battery units are arranged in a mesh architecture, so that each storage battery unit powers three electric motors and each electric motor receives power from two battery units. According to the mesh architecture, a first pair of storage battery units commonly drives both windings of an associated first electric motor and a second pair of storage battery units commonly drives both windings of an associated second electric motor.

For any such kind of aircrafts and any other type of aircraft, resilience against technical failures is one of the most important aspects, which substantially concerns also the electrical power distribution network of the aircraft.

Electrical power distribution networks for safety-critical applications such as aircrafts all suffer from an inherent contradiction: segregation prevents fault propagation, but unification allow efficient load sharing across power sources. Typical approaches involve segregated "power lanes" which contain electrical faults to one lane, but do not benefit from load sharing across sources. Any approach using unification is considered to be inherently unsafe because electrical faults propagate across the entire network and cause either a transient or steady-state power interrupt. Therefore, typical electrical power distribution networks for safety-critical applications strictly follow the path of segregation, and thus miss out on the benefits of unification.

According to conventional approaches, a certain unification might be introduced in response to the occurrence of a failure, for compensating this failure. For example, a traditional aircraft electrical system may use electromechanical relays to provide unification, but with a reduction in safety tolerance and hence only deployed following system failures.

It is known to use solid-state and electromechanical switching devices in electrical power distribution networks, for enabling and disabling power transmission between associated portions of the electrical power distribution network depending on current circumstances and requirements.

Further, it is known to use solid-state and electromechanical Circuit Protection Devices ("CPDs"), such as solid-state and electromechanical circuit breakers, in electrical power distribution networks, for protecting the electrical wiring and electrical load downstream, when a short circuit occurs. It is also known, to use co-called "Solid-State Power Controllers" or "Solid State Power Controllers", which are commonly denoted as "SSPCs", as circuit protective devices in electrical power distribution networks, including electrical power distribution networks of aircrafts, replacing conventional electromechanical circuit breaker or even "old school" fuses.

A Solid-State Power Controller ("SSPC") is a circuit protection device, like a fuse or another kind circuit breaker, and therefore is intended to protect the electrical wiring and electrical load downstream, when a short circuit occurs. Compared to traditional electromechanical devices (fuses and circuit breakers), SSPCs have an number of advantages, such as that they are faster to open when a short circuit occurs, that they can be lighter and use a smaller volume, that they are software-resettable (no need to manually access it for maintenance or carry spare fuses), that they are very flexible in terms of current and voltage trip ratings, that they can self-test to avoid dormant failures, that they can record data on the health of the electrical system, and that they can perform additional functions, including the function of a switching device. To this end SSPCs include a microcontroller, a communications interface for data communication with a superordinate controlling entity, one or plural load channels with monitoring functionalities for monitoring at least one electrical condition of each load channel and within each load channel a solid-state switch like at least one Metal-Oxide field-effect transistor (MOSFET), at least one Bipolar Transistor (BJT), a Silicon-Controlled Rectifier (SCR) and a Triac, for example. The microcontroller monitors the at least one electrical condition including the current flowing through the respective load channel to the respective load and commands the solid-state switch to open, if an electric trip condition occurs, for example that the detected current exceeds a certain threshold. Plural electric trip conditions may be set for dealing with different kinds of electrical failures.

Various SSPC distribution architectures are known, such as a hierarchic architecture optimized for a centralized control of a greater number of SSPCs (e.g. >40 SPPs) from a Vehicle Management System (VMS) having at least one Electric System Controller (ESC). The control is effected via Solid State Power Managers (SSPMs), which are grouped together with associated SSPCs in Secondary Power Distribution Units (SPDUs). A less hierarchic architecture known as well is usually used for a centralized control of a lesser number of SSPCs (e.g. <40 SPPs) from the Vehicle Management System (VMS). The SSPCs are grouped in Primary Power distribution Units (PPDUs). The SSPC distribution architectures might provide for redundancy, by including at least two Electric System Controllers (ESCs) in the Vehicle Management System (VMS) and including at least two Solid State Power Managers (SSPMs) in each Secondary Power Distribution Unit (SPDU).

For an electrical power system of an electrically powered aircraft having a plurality of electrical power sources in the form of storage batteries or storage battery units for powering various electrical loads or aircraft devices, an unbalanced discharging of these power sources is undesired and may result in problems. In addition, the flight range could be negatively affected by unbalanced discharging of storage batteries. For achieving a high performance of the aircraft, it is favorable, if a respective electrical load or aircraft device such as each of plural lift/thrust units could be driven by plural independent power sources, at least in certain circumstances, such as flight maneuvers requiring increased driving power for the lift/thrust units.

In view of the foregoing, it is an object of the present invention, to provide an electrical power system for an aircraft and a corresponding operating method, which allow achieving substantial resiliency against electrical failures in an efficient manner.

It is a further object of the present invention, to provide an electrical power system for an aircraft and a corresponding operating method, which enable a high aircraft performance, with respect to flight maneuvers requiring increased driving power as well as an achievable flight range.

It is a further object of the present invention, to provide an electrical power system for an aircraft and a corresponding operating method, which allow achieving uniform discharge of power sources in the form of storage batteries or storage battery units.

SUMMARY OF THE INVENTION

For achieving at least one of these objects, the invention provides an electric power system for an aircraft, comprising a plurality of electrical loads, a plurality of electrical power sources and an electrical power distribution network configured to connect the electrical power sources with the electrical loads, such that each electrical load can be driven by at least one associated electrical power source via at least one associated power lane of the electrical power distribution network.

The electrical power distribution network comprises at least one of a circuit protection arrangement and a circuit switching arrangement having a plurality of switchable or interruptible power links, wherein each power link has two connection ports and wherein each power link is configured to connect the connection ports in a first operational mode, for transmitting power from a driving power lane or driving power lane section connected to one of the connection ports to a driven power lane or driven power lane section connected with the other one of the connection ports, and is configured to interrupt the connection between the connection ports in a second operational mode, for preventing the transmission of power between the driving power lane or driving power lane section and the driven power lane or driven power lane section.

The electrical power distribution network is configured to operate in at least one normal operation mode and in at least one electrical failure mitigating operation mode.

The electrical power distribution network, in the normal operation mode, provides for load sharing across electrical power sources, such that at least one group of electrical power sources of said plurality of electrical power sources commonly drives at least one associated group of electrical loads of said plurality of electrical loads via power lanes or power lane sections associated thereto and at least one power link associated thereto and assuming the first operational mode.

The electrical power distribution network, in the electrical failure mitigating mode, provides for electric fault isolation, such that a network portion of the electrical power distribution network including an electrical fault is isolated from at least one other network portion of the of the electrical power distribution network by at least one power link assuming the second operational mode.

The proposed electric power system allows combining the advantages of a unified electrical network as well as of a segregated electrical network. In the normal operating mode assumed in the normal flight operation of the aircraft, unification between power lanes of the network allows efficient load sharing across power sources. If an electric fault occurs, the electric power distribution network assumes the electric failure mitigating operation mode, which provides for segregation between power lanes that are concerned and therewith for isolating the electrical fault.

According to the invention, a unified electrical network can be achieved with all its advantages, which are resulting from the unification, for the normal operation of the aircraft, although such a unification is considered to be unsafe for safety critical applications like aviation according to conventional approaches.

Therewith, the electrical power system of the invention is substantially distinguished from traditional electrical power distribution networks of aircrafts, which have certain electrical loads irrevocably allocated to certain power sources through the use of segregated power lanes in the normal operation of the aircraft. This allocation results in a non-uniform power demand on the sources, which is sub-optimal, especially for battery electric vehicle/aircraft applications. Secondly, following failure of a power lane, the segregation must be suspended by introducing a certain unification, in order to provide continuity of supply to the electrical loads. This loss of segregation results in a reduction of safety margin.

According to the present invention, a completely different approach is pursued. Plural or all power sources and plural or all electrical loads are unified or connected together in normal operation, which is optimal for load-sharing across sources and therewith uniform power demand on the sources. Storage batteries serving as power sources are discharged uniformly. Any electrical faults are safely isolated before they can propagate and then, after the fault is extinguished, the unification can be safely re-established and the network returns to the normal operation. This electric fault isolation can be done in extremely fast manner by using appropriate technical components, such as Solid-State Power Controllers (SSPCs), which may be used as a first stage fast-acting isolation according to the invention, not with the purpose of isolating failed sources or failed loads, but with the purpose of introducing segregation in a purposeful manner, for mitigating the electric failure.

In comparison to a standard unified network, the fault isolation by purposeful segregation enables to extinguish the fault easily and faster, since it is easier to extinguish the fault in the segregated or partially segregated power distribution network, when only one or a limited number of power sources is supplying the fault, contrary to many power sources, which would be the case in a standard unified network.

The electrical power distribution network may be configured to provide for partial load sharing across electrical power sources with respect to associated electrical loads in a time variable manner according to a plurality of different partial load sharing modes sequentially adopted by the electrical power distribution network, such that plural groups of electrical power sources of said plurality of electrical power sources and plural associated groups of electrical loads of said plurality of electrical loads would be provided, wherein the respective group or groups of electrical power sources which is/are active at a certain point of time to commonly drive at least one associated group of electrical loads would vary sequentially, preferably periodically. However, in the context of the present disclosure a permanent continuous load sharing across the electrical power sources in the normal operation mode is more preferred.

To advantage, the electric power distribution network may be configured to assume the electric failure mitigating operation mode in such a matter that an electrical fault occurring at an electrical power source of said group of electrical power sources can be isolated from at least one other electrical power source of said group of electrical power sources and from at least one electrical load of said group of electrical loads and that an electrical fault occurring at an electrical load of said group of electrical loads can be isolated from at least one electrical power source of said group of electrical power sources and at least one other electrical load of said group of electrical loads, such that at least one electrical power source not affected by the electrical fault and belonging to said group of electrical power sources is enabled to drive at least one electrical load not affected by the electrical fault and belonging to said group of electrical loads; wherein the isolation of the electrical fault is effected by at least one power link, which changes its operational mode from the first operational mode to the second operational mode.

If desired, plural electrical loads of the same kind may form the group of electrical loads. Alternatively, plural electrical loads of different kinds may form the group of electrical loads. Plural different groups of such kind may be provided.

According to a preferred embodiment, the electrical power distribution network is configured to provide in the normal operation mode load sharing across all electrical power sources, such that all electrical power sources of said plurality of electrical power sources commonly drive all electrical loads of said plurality of electrical loads via respective power lanes or power lane sections and respective power links assuming the first operational mode; wherein the electrical power distribution network is configured to assume the electrical failure mitigating operation mode in such a manner that an electrical fault occurring at an electrical power source or at an electrical load can be isolated, such that plural or all electrical power sources not affected by the electrical fault are enabled to drive plural or all electrical loads not affected by the electrical fault.

There are no limitations concerning the architecture and structure of the electric power distribution network and the arrangement of its power lanes. According to a preferred approach, the electric power distribution network may comprise plural power lanes of a first kind; wherein each power lane of the first kind has associated at least one associated electrical power source, which is not associated to another power lane of the first kind, and wherein each power lane of the first kind has associate at least one electrical load, which is not associated to another power lane of the first kind, such that the at least one associated electrical power source is connected or connectable via the respective power lane of the first kind with the at least one associated electrical load, for enabling the at least one electrical power source to drive the at least one electrical load via the respective power lane of the first kind, without necessarily involving a driving via another power lane of the first kind. According to the conventional approach referred to in the foregoing, these power lanes of the first kind would be segregated from each other, at all times or in the normal operation of the aircraft.

Unification between plural power lanes of the first kind may be achieved by power lanes of another kind, which are provided in addition to the power lanes of the first kind. In this respect, it is proposed that plural power lanes of the first kind are connected or connectable via a connecting lane arrangement of the electrical power distribution network, the connecting lane arrangement comprising one or plural power lanes of a second kind, for enabling load sharing across electrical power sources associated to at least one group of the power lanes of the first kind or associated to all power lanes of the first kind with respect to electrical loads associated to these power lanes of the first kind, by transmitting power between these power lanes of the first kind via at least one power lane of the second kind.

The connecting lane arrangement may comprise to advantage at least one connecting lane, which is associated to at least two, preferably at least three power lanes of the first kind, which are connected or connectable with the connecting lane via a respective power lane of the second kind being associated to the respective power lane of the first kind.

The connecting lane arrangement may favorably comprise one or plural power lanes of a second kind, wherein each power lane of the second kind has associated two power lanes of the first kind, such that the two power lanes of the first kind are connected or connectable via the power lane of the second kind, for enabling load sharing across the electrical power sources associated to the two power lanes of the first kind with respect to the electrical loads associated to the two power lanes of the first kind, by transmitting power between the two power lanes of the first kind via the power lane of the second kind. In this respect, it is preferred that this transmission of power between the two power lanes of the first kind via the power lane of the second kind doesn't necessarily involve a transmission of power via another power lane of the second kind.

The power lanes of the first and second kinds may be arranged in various different manners or according to various typologies. Generally, it would be appropriate if the electrical power distribution network comprises two, three or more power lanes of the second kind, which are associated to plural power lanes of the first kind in such a manner, that each of said plural power lanes of the first kind is connected or connectable via a respective power lane of the second kind with at least one other of the power lanes of the first kind.

In this respect, it is further proposed according to a first implementation approach that each of said plural power lanes of the first kind or of a sub-group of said plural power lanes of the first kind is connected or connectable via a respective power lane of the second kind with two other of said plural power lanes of the first kind or sub-group of power lanes of the first kind, such that load sharing across electrical loads in a ring topology is enabled.

According to a second implementation approach implemented in addition or alternatively, it is proposed that two power lanes of said plural power lanes of the first kind or of a sub-group of said plural power lanes of the first kind are connected or connectable via a respective power lane of the second kind with only one other power lane of said plural power lanes of the first kind or said sub-group of power lanes of the first kind or with each other, wherein each other power lane of said plural power lanes of the first kind or of said sub-group of said plural power lanes of the first kind, if one or plural of such other power lanes are provided, is connected or connectable via a respective power lane of the second kind with two other of the power lanes of said plural power lanes of the first kind or of said sub-group of power lanes of the first kind, such that load sharing across electrical loads in a line topology along all these power lanes of the second kind is enabled. This includes also the case that only two power lanes of the first kind are provided, which are connected or connectable with each other via a power lane of the second kind.

According to a third implementation approach to be implemented alternatively to the first and second implementation approach or together with one or both of the first and second implementation approach, it is proposed that one power lane of said plural power lane of the first kind or of a sub-group of said plural power lanes of the first kind is connected or connectable via a respective power lane of the second kind with at least three other power lanes of said plural power lanes of the first kind or said sub-group of power lanes of the first kind, such that load sharing across electrical loads in a star topology is enabled. Each of these at least three other power lanes may be the starting power lane of a power lane line including plural power lanes according the mentioned line topology, if desired.

According to a preferred variant of the third implementation approach, it is proposed that the or a connecting lane of the connecting lane arrangement is connected or connectable via a respective power lane of the second kind with at least three power lanes of said plural power lanes of the first kind or said sub-group of power lanes of the first kind, such that load sharing across electrical loads in a star topology is enabled. Each of these at least three other power lanes may again be the starting power lane of a power lane line including plural power lanes according to the mentioned line topology, if desired.

The variant of the third implementation approach has a substantial advantage in that the connecting lane instead of a power lane of the first kind serves as hub or center of the star topology, so that it is very unlikely that this hub or center could be directly affected by an electrical failure. This hub or center may be shielded from any of the associated power lanes of the first kind and therewith from any electrical failure that might occur here by the respective power link of the second kind. This allows maintaining a partial load sharing, even if an electrical failure occurs which directly affects any one of the power lanes of the first kind.

Preferably, the power lanes of the first kind each include a power link of a first kind, which allows in its first operational mode the transmission of electrical power via this power link of the first kind from the associated at last one electrical power source to the associated at least one electrical load and which inhibits in its second operational mode the transmission of electrical power via this power link of the first kind from the associated at last one electrical power source to the associated at least one electrical load.

Such a power link of a first kind may essentially correspond to a conventional circuit breaker like a fuse or electromechanical or solid-state Circuit Protection Device, which serves to protect the electrical wiring and the electrical load downstream, when a short circuit occurs. Therefore, each power link of the first kind may be configured to change its operational mode from the first operational mode to the second operational mode, within a tripping time interval of a first order of magnitude in response to at least one preset or pre-settable electrical trip condition, which indicates an electrical fault.

The power link of the first kind may be configured to trip according to one or plural predetermined electrical trip condition. Any appropriate electrical trip condition known in the art may be implemented. This implementation may be an implementation in hardware like conventional fuses and circuit breakers, which have predefined electrical trip conditions, such as predefined set of trip curves implemented by the manufacturer, so that one would have to change the part number of the device when ordering the device to change the trip curve.

For example, the at least one predetermined electrical trip condition may comprise at least one of i) an electrical current which is transmitted via the power link of the first kind and which exceeds a predetermined electrical current trip threshold and ii) a i2t quantity representing an electric energy which is dissipated via the power link of the first kind within a predetermined reference time interval and which exceeds a predetermined electrical i2t trip threshold.

According to a preferred implementation, each power link of the first kind is provided by an electromechanical or solid-state Circuit Protection Device of the electrical power distribution network, for example by an electromechanical or solid-state circuit breaker. Solid-state devices are preferred. It shall not be ruled out that the power links of the first kind are realized by one or plural Solid-State Power Controllers (SSPCs) of the electrical power distribution network.

For enabling that the electrical power distribution network can assume a configuration providing for unification and a configuration providing for segregation, it is proposed that the power lanes of the second kind each include a power link of a second kind, which allows in its first operational mode the transmission of electrical power between power lanes of the first kind via this power link of the second kind and which inhibits in its second operational mode the transmission of electrical power between power lanes of the first kind via this power link of the second kind.

Each power link of the second kind may be configured to change its operational mode from the first operational mode to the second operational mode, within a tripping time interval of a second order of magnitude in response to at least one preset or pre-settable electrical trip condition, which indicates an electrical fault. For allowing that the electrical power distribution network reacts sufficiently fast to an electrical fault for introducing the needed segregation for fault isolation, it is proposed that the tripping time interval of the first order of magnitude of the power links of the first kind substantially exceeds the tripping time interval of the second order of magnitude of the power links of the second kind. Therewith one can achieve that only one or plural of the power links of the second kind trip and switch over to the second operational mode, but within the time interval before the tripping of the power link or power links of the second kind none of the power links of the first kind. Only at a later time, after the achievement of the fault isolation, typically only one particular power link of the first kind will trip, which is still affected by the electrical fault after the segregation or partial segregation.

Various appropriate electrical trip conditions known in the art may be implemented by a corresponding configuration of the power link or power links of the second kind. In this respect, it is proposed that the at least one predetermined electrical trip condition comprises at least one of i) an electrical current which is transmitted via the power link of the second kind and which exceeds a predetermined electrical current trip threshold, ii) a i2t quantity representing an electric energy which is dissipated via the power link of the second kind within a predetermined reference time interval and which exceeds a predetermined electrical i2t trip threshold and iii) a thermal energy which is determined on basis of a thermal model by a controller of the electrical power distribution network to having been accumulated in an associated component of the electrical power system within a predetermined reference time interval and which exceeds a predetermined thermal energy trip threshold.

For being sufficiently fast each power link of the second kind should typically be provided by an associated solid-state Circuit Protection Device of the electrical power distribution network, for example by a solid-state circuit breaker. Accordingly, sufficiently fast conventional solid-state circuit breakers may be used for implementing the invention with respect to the power links of the second kind, which achieve to the segregation between power lanes of the first kind, before any of the power links of the first kind trips and changes over to its second operational mode.

However, according to a particular preferred approach, each power link of the second kind is provided by an associated Solid-State Power Controller of the electrical power distribution network, which comprises a microcontroller, at least one load channel forming the power link of the second kind, at least one solid-state switch included in the load channel and operable under the control of the microcontroller, wherein the microcontroller is configured to switch the solid-state switch between a conducting state corresponding to the first operational mode of the power link of the second kind and a non-conducting state corresponding to the second operational mode of the power link of the second kind and is configured to monitor at least one current electric condition of the load channel, for responding on the occurrence of an electrical trip condition by switching the solid-state switch from the conducting state to the non-conducting state. Substantial advantages are achieved by using one or plural Solid-State Power Controllers for realizing the power links of the second kind.

According to a particularly preferred embodiment, which may be realized in a particular favorable manner by using Solid-State Power Controllers as power links, the electrical power distribution network is configured to provide for electric fault isolation by assuming subsequently at least three fault isolation stages when switching from the normal operation mode to the electrical fault mitigating mode in response to the occurrence of an electric fault; wherein a first fault isolation stage provides for segregation of power lanes from each other, by at least one power link which switches from its first operational mode to its second operational mode; wherein a subsequent second fault isolation stage provides for fault isolation within a power lane still affected by the electric fault, by a power link which switches from its first operational mode to its second operational mode; and wherein a subsequent third fault isolation stage provides for partial restauration of load sharing across electrical power sources not affected by the electric fault with respect to electrical loads not affected by the electric fault, by at least one power link which switches from its second operational mode to its first operational mode and is isolated from the electric fault by at least one other power link assuming the second operational mode.

The first fault isolation stage may favorably provide for segregation of power lanes of the first kind from each other, by at least one power link of the second kind, which is included in a respective power lane of the second kind and switches from its first operational mode to its second operational mode.

The second fault isolation stage may favorably provide for fault isolation within a power lane of the first kind, by a power link of the first kind included in this power lane of the first kind, which switches from its first operational mode to its second operational mode.

The third fault isolation stage may favorably provide for partial restauration of load sharing across electrical power sources not affected by the electric fault with respect to electrical loads not affected by the electric fault, by at least one power link of the second kind which is included in a respective power lane of the second kind and switches from its second operational mode to its first operational mode and is isolated from the electric fault by at least one other power link which continues to assume the second operational mode.

The third fault isolation stage is particularly useful, since plural power links of the second kind may have tripped and switched over to the second operational mode, also one or plural power links which had been connected with the location of the electric fault not directly, but only via one or plural other power links of the second kind. After achievement of the fault isolation, such power links of the second kind may switch back to their first operational mode for reintroducing partial unification such that load sharing across electrical power sources is partially restored.

Accordingly, the at least one other power link, which continues to assume the second operational mode and isolates one or plural power links of the second kind from the electric fault, may comprise at least one power link of the second kind included in the respective power lane of the second kind. However, it is also possible that at least one other power link, which continues to assume the second operational mode and isolates one or plural power links of the second kind from the electric fault comprises the power link of the first kind which switched from its first operational mode to its second operational mode according to the second fault isolation stage.

The electrical power distribution network may favorably include at least one controller, which is configured to control the partial restauration of load sharing across electrical power sources according to the third fault isolation stage, by being configured to determine on basis of at least one of a measured electric quantity, plural measured electric quantities and data representing a current operational mode of one or plural power links, which of plural power links of the second kind which switched from its first operational mode to its second operational mode according to the first fault isolation stage, is isolated from the electric fault by at least one other power link assuming the second operational mode and therefor shall switch back to the first operational mode for partially restoring the load sharing.

In this respect, one may provide for local control of the partial restoration of load sharing. For example, if the power links of the second kind are formed by load channels of one or plural Solid-State Power Controllers of the electrical power distribution network, the microcontroller of each respective Solid-State Power Controller may favorably be configured to control the partial restauration of load sharing across electrical power sources according to the third fault isolation stage, by being configured to monitor at least one current electric condition of the respective load channel in the non-conducting state of its solid-state switch, preferably at least one respective current electric condition on both load channel sides of the solid-state switch, for determining whether the load channel is isolated from the electric fault by at least one other power link assuming the second operational mode and therefor shall be switched back to the conducting state of partially restoring the load sharing.

According to another favorable approach, at least one superordinate controller of the electrical power distribution network, for example a so-called Solid-State Power Manager (SSPM) of a Secondary Power Distribution Unit (SPDU) or an Electric System Controller (ESC) of a Vehicle Management Computer (VMC) in case of the implementation of a corresponding SSPC distribution architecture, or a flight control computer system of the aircraft, may be configured to control the partial restoration of load sharing across electrical power sources according to the third fault isolation stage, by being configured to receive status data or status signals from one or plural Circuit Protection Devices or/and one or plural Solid-State Power Controllers or/and by being configured to monitor current electric conditions of power lanes or power lane sections of the electrical power distribution network, and by being configured to determine on basis of one or both of these status data and this monitoring, which of plural power links of the second kind currently assuming the second operational mode shall be commanded to switch back to the first operational mode for partially restoring the load sharing.

For achieving at least one of the mentioned objects, the invention further provides a method for operating an electrical power system of an aircraft, which comprises a plurality of electrical loads, a plurality of electrical power sources and an electrical power distribution network configured to connect the electrical power sources with the electrical loads, such that each electrical load can be driven by at least one associated electrical power source via at least one associated power lane of the electrical power distribution network. The electrical power distribution network comprises a plurality of switchable or interruptible power links, each being provided within a respective power lane of the electrical power distribution network, for enabling the transmission of power via the respective power lane in a first operational mode of the power link and for preventing the transmission of power via the respective power lane in a second operational mode of the power link.

The method comprises to operate the electrical power distribution network in at least one normal operation mode, which provides for load sharing across electrical power sources, such that at least one group of electrical power sources of said plurality of electrical power sources commonly drives at least one associated group of electrical loads of said plurality of electrical loads via respective power lanes including at least one power lane having a power link which assumes the first operational mode.

The method further comprises to operate the electrical power distribution network in at least one electrical failure mitigating operation mode, which provides for electric fault isolation, such that a network portion of the electrical power distribution network including an electrical fault is isolated from at least one other network portion of the of the electrical power distribution network by at least one power link assuming the second operational mode.

The method of the invention provides for the combination of the advantages of the conventional segregation approach with the advantages of the conventional unification approach without compromising safety against critical failures, as discussed above with respect to the electrical power system of the invention.

The electrical power distribution network of the electrical power system may include power lanes of a first kind each having included a respective power link of a first kind. Further, the electrical power distribution network of the electrical power system may include one or plural power lanes of a second kind each having included a respective power link of a second kind. Each power lane of the first kind may connect at least one associated electrical power source with at least one associated electrical load, for enabling the at least one associated electrical power source to drive the at least one associated electrical load, without necessarily involving a driving via another power lane of the first kind. Further, each power lane of the second kind may be connected or connectable with at least two associated power lanes of the first kind, for enabling the transmission of power between these power lanes of the first kind, such that load sharing across the electrical power sources associated to these power lanes of the first kind with respect to the electrical loads associated to these power lanes of the first kind can be achieved.

With respect to such an electrical power distribution network, the method may favorably involve to change the operational modes of one or plural of the power links of the second kind from the first operational mode to the second operational mode, for isolating the electric fault in the electrical failure mitigating mode.

The method may favorably further involve to maintain one or plural of the power links of the second kind in the first operational mode or/and may favorably further involve to change the operational mode of one or plural of the power links of the second kind from the second operational mode to the first operational mode, for load sharing across electrical power sources in the normal operating mode or/and for restoring a partial load sharing across electrical power sources in the electrical failure mitigating mode.

To advantage, the method of the invention may generally comprise: i) a first fault isolation step, which provides for segregation of power lanes from each other, by switching at least one power link from its first operational mode to its second operational mode; ii) a subsequent second fault isolation step, which provides for fault isolation within a power lane still affected by the electric fault, by switching a power link from its first operational mode to its second operational mode; and iii) a subsequent third fault isolation step, which provides for partial restauration of load sharing across electrical power sources not affected by the electric fault with respect to electrical loads not affected by the electric fault, by switching at least one power link, which is isolated from the electric fault by at least one other power link assuming the second operational mode, from its second operational mode to its first operational mode.

If the power lanes of the first and second kind and the power links of the first and second kind are provided, the method may favorably comprise: i) a first fault isolation step, which provides for segregation of power lanes of the first kind from each other, by switching at least one power link of the second kind from its first operational mode to its second operational mode; ii) a subsequent second fault isolation step, which provides for fault isolation within a power lane of the first kind still affected by the electric fault, by switching the power link of the first kind included in this power lane from its first operational mode to its second operational mode; and iii) a subsequent third fault isolation step, which provides for partial restauration of load sharing across electrical power sources not affected by the electric fault with respect to electrical loads not affected by the electric fault, by switching at least one power link of the second kind, which is isolated from the electric fault by at least one other power link of the second kind and assumes the second operational mode, from its second operational mode to its first operational mode.

Substantial advantages are achieved as discussed with respect to the electrical power system of the invention, which is configured to provide for electric fault isolation by assuming subsequently the first, second and third fault isolation stages.

In view of the foregoing, the present invention provides a method of safely isolating electrical faults, in particular short circuits, in an electrical power distribution network, which uses two or more stages of circuit protection devices acting at different speeds. To advantage, the uniquely fast isolation times and resettable nature of Solid-State Power Controllers (SSPCs) may be utilized to allow safe load sharing while preventing electrical fault propagation.

The invention further provides a general electric power system for an aircraft, which is characterized by being configured to operate according to the method of the invention.

The electrical power system of the invention and the method for operating an electrical power system may be applied to or provided within any kind of aircraft, in principle. Therefore, the invention provides an aircraft comprising an electrical power system, as described, or comprising an electrical power system, which is configured to operate according to the method of the invention, as described. This aircraft is preferably at least one of a single pilot aircraft, and aircraft having a vertical take-off and landing capability and an aircraft of the canard type. Further, the aircraft preferably is an electrically powered aircraft, as follows from the preceding discussions.

According to a preferred embodiment, the electrical power system may comprise at least one group of electrical loads of a common type in the form of aircraft devices, which are of critical relevance for maintaining a safe flight operation of the aircraft, wherein the aircraft devices are arranged in a number and configuration at one or both of the fuselage of the aircraft and wings of the aircraft to achieve a resiliency against failures, such that various subgroups of the plural aircraft devices each comprising at least two of the aircraft devices of the common type may fail without endangering the flight capability and the controllability of the aircraft. The aircraft devices of the common type may be electrically powered lift/thrust units of the aircraft.

To advantage, the aircraft devices of the or each respective subgroup are associated to one particular common power lane of the electrical power distribution network of the electrical power system, for being commonly drivable via this common power lane, and wherein the aircraft devices of the or each respective subgroup are provided arranged in a symmetrically distributed manner at one or both of the fuselage of the aircraft and wings of the aircraft, such that an electrical fault which directly or indirectly affects the common power lane and results in a failure of the aircraft devices of this subgroup doesn't endanger the flight capability and the controllability of the aircraft.

The respective particular common power lane of the electrical power distribution network may be a power lane of the first kind, as considered in the foregoing. Load sharing across plural or all subgroups may be enabled by power links of the second kind, as considered in the foregoing.

DETAILED DESCRIPTION

Below a "FIRST APPROACH" and a "SECOND APPROACH" for achieving major advantages of conventional power network segregation as well as of conventional power network unification in a favorable and synergistic manner are described, which both are approaches of the present invention, so that the examples given for implementing the two approaches all are non-limiting illustrative embodiments of the present invention. However, in the context of the present disclosure, the "FIRST APPROACH" is preferred over the "SECOND APPROACH".

FIGS. 1 to 5 illustrate a non-limiting example for an aircraft, which may be designed to have an electric power system according to the present invention.

Figure 1:
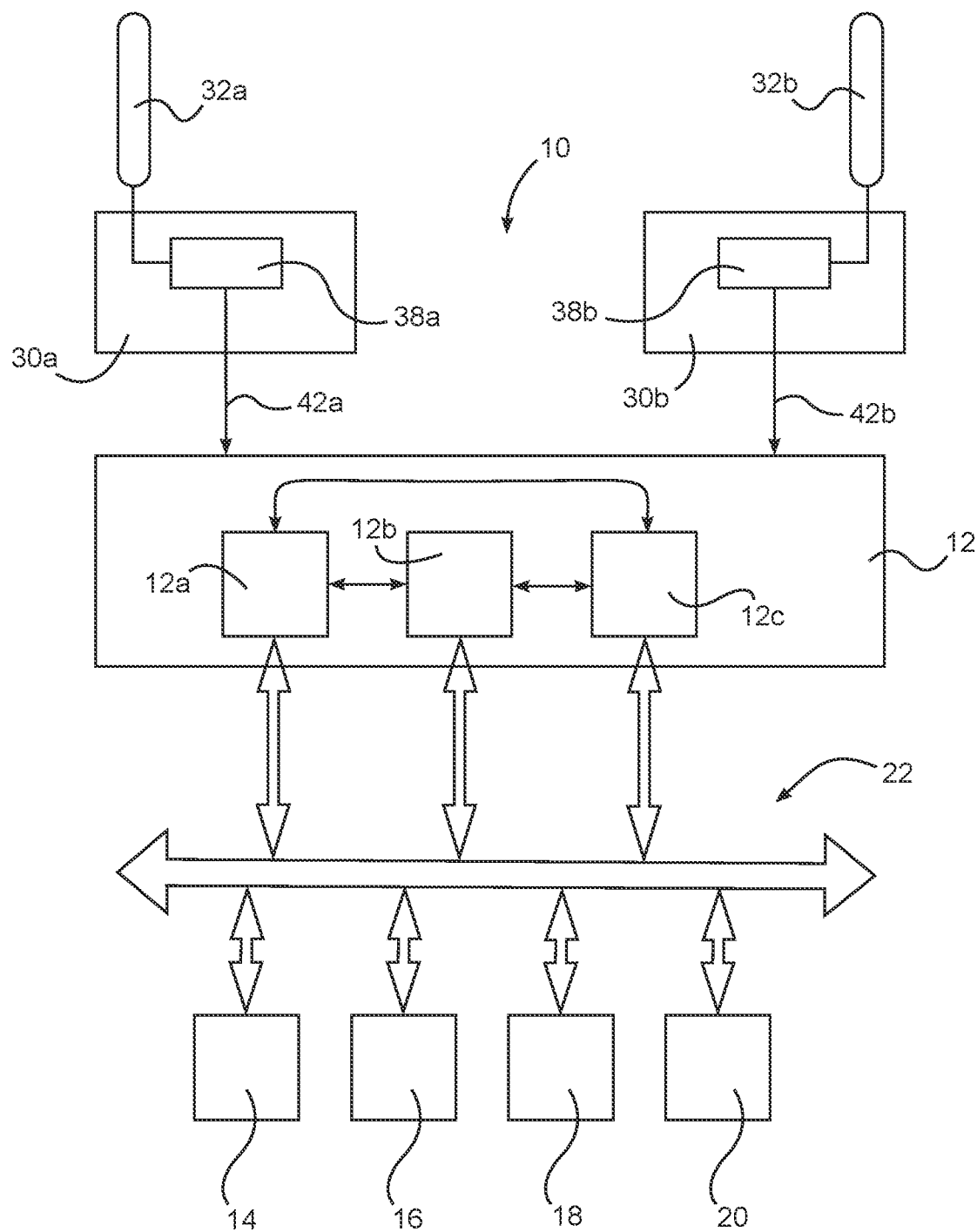
FIG. 1 shows schematically a flight control system of an aircraft having a user interface for the pilot, a redundant flight control computer system an electronic or optoelectronic bus system connecting aircraft devices with the flight control computer system, wherein the aircraft devices belong to an electrical power system (not shown) of the aircraft.

FIG. 1 shows and illustrates schematically a non-limiting example for a flight control system 10 of the aircraft. The flight control system has a flight control computer system 12, which may be realized according to conventional concepts, in particular concepts, which provide for redundancy. An example is an as such conventional triplex architecture having three redundant flight control computers 12a, 12b and 12c, which may be connected redundantly with the pilot user interface on the one hand and elements and devices of the aircraft to be controlled based on the pilot's commands on the other hand. As examples for conventional redundancy concepts, it may be referred to U.S. Pat. No. 7,337,044 B2, U.S. Pat. No. 8,935,015 B2 and U.S. Pat. No. 8,818,575 B2.

In FIG. 1, various components of the aircraft are represented schematically by elements 14 to 20, which may represent various aircraft devices, such as sensors, actuators (such as actuators for controllably moving flight control surfaces such as flaps and the like), propulsion engines and the like, which may be controlled and monitored by the flight control computer system 12 via a suitable control bus system, e.g. a CAN bus system 22.

The flight control system 10 further comprises a pilot user interface, which may include a left sidestick apparatus 30a and a right sidestick apparatus 30b, the left sidestick apparatus having a left sidestick 32a with a sidestick sensor assembly 38a and the right sidestick apparatus having a right sidestick 32b with a sidestick sensor assembly 38a. The flight control computer system 12 may receive control signals from the pilot user interface via electronic or optical connection links 42a and 42b.

Figure 2:
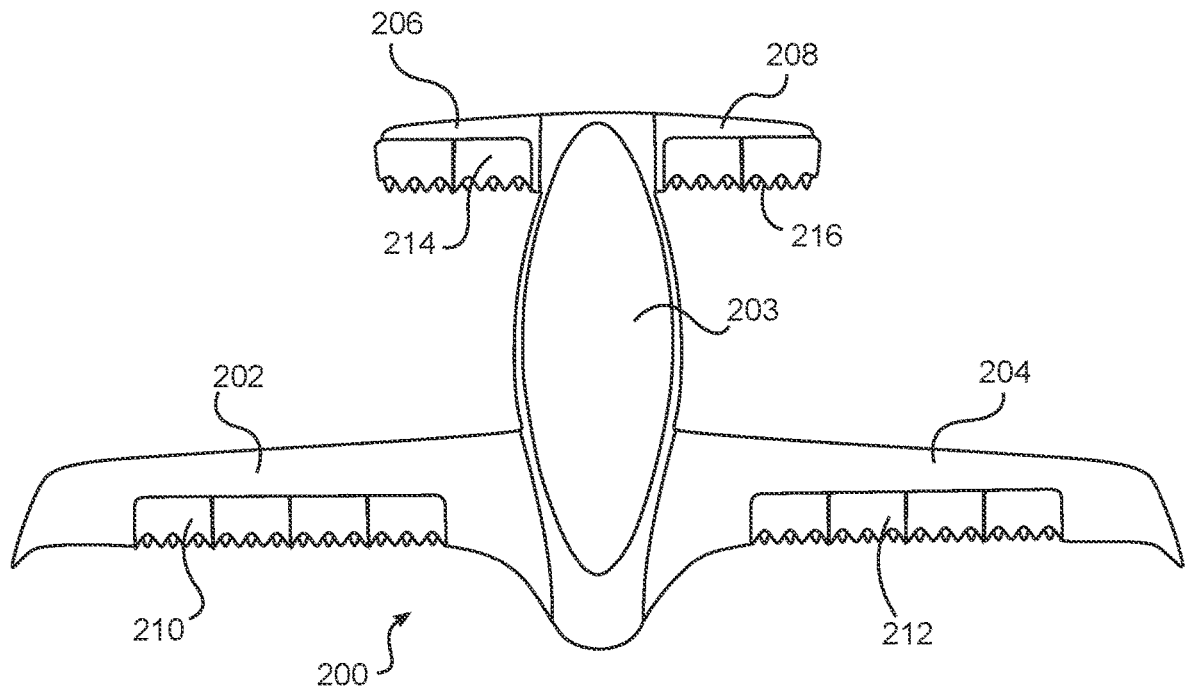
FIG. 2 is schematic top down view on a canard type aircraft of a first variant, which may be realized as single pilot aircraft having VTOL capability and may be provided with an electrical power system comprising aircraft devices and electrical power sources powering the aircraft devices according to the present invention.
Figure 3:
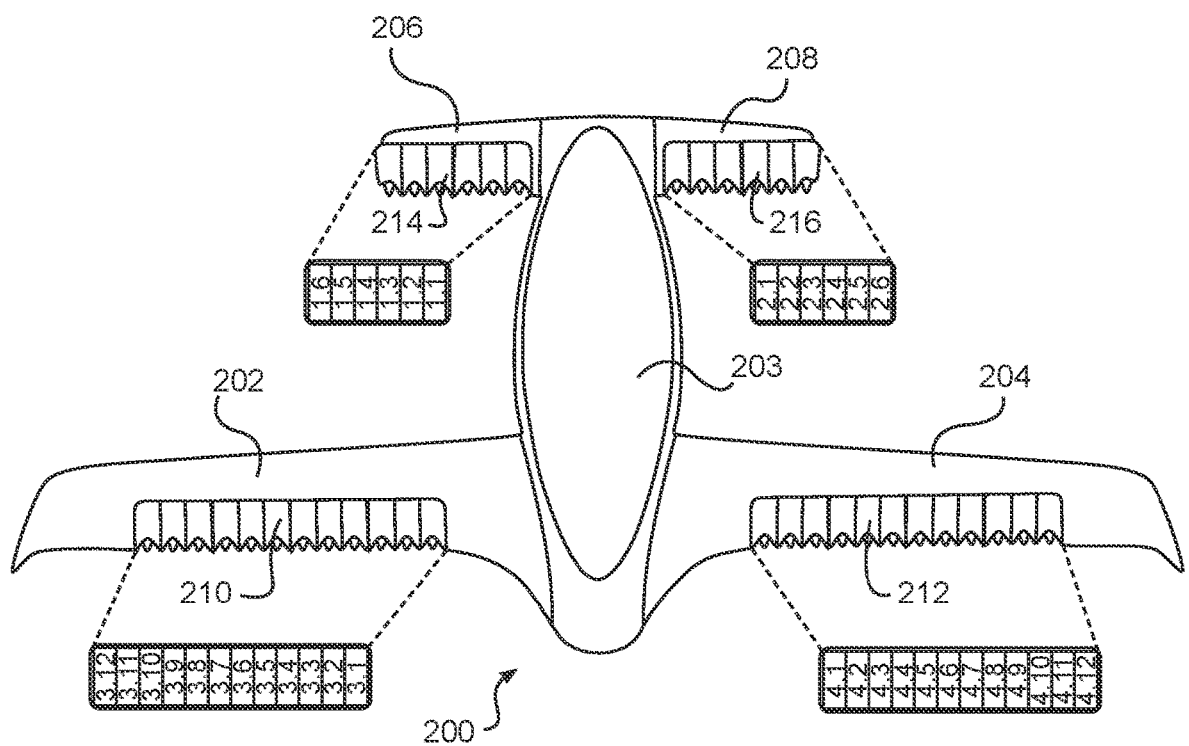
FIG. 3 is schematic top down view on a canard type aircraft of a second variant, which may be realized as single pilot aircraft having VTOL capability and may be provided with the electrical power system according to the present invention.

FIGS. 2 and 3 illustrate two canard-type aircrafts as non-limiting examples, to which the present invention may be applied and which might have a flight control system as illustrated in FIG. 1. The canard-type aircraft 200 has a fixed left aft or main wing 202 and a fixed right aft or main wing 204 at an aft portion of the fuselage 203 of aircraft and a fixed left front or canard wing 206 and a fixed right front or canard wing 208 at a front portion of the fuselage of the aircraft. Each wing is provided with an array of plural flaps 210, 212, 214 and 216, respectively. For example, at least six flaps per front wing or canard and at least twelve flaps per aft wing or main wing could be provided.

The shown embodiment of FIG. 2 has two flaps per front wing or canard and four flaps per aft wing or main wing, and the shown embodiment of FIG. 3 has six flaps per front wing or canard and twelve flaps per aft wing or main wing.

The flaps of both embodiments are mounted pivotably or moveably to the respective wing and can be pivoted about a pivoting axis or moved with a pivoting movement component by a respective electric actuator arrangement, preferably independently of each other for each flap. Each flap can be pivoted between an upper first operational position and a lower second operational position. Each flap may assume a position of minimum or vanishing inclination with respect to a longitudinal axis of the aircraft, possibly the upper first operational position, and a position of maximum downward inclination with respect to the longitudinal axis of the aircraft, possibly the lower second operational position. However, if the position of maximum downward inclination corresponds to a vertical orientation of the flap, the lower second operational position may alternatively be a position beyond the position of maximum downward inclination, so that the flap points slightly forward.

To each of these flaps at least one propulsion engine in the form of a ducted propeller, which is operated electrically, is mounted. The ducted propellers preferably are mounted to an upper surface of the respective flap. Alternatively, the propulsion engines may be integrated into a respective flap in a manner, that an air channel of the respective propulsion engine, in which the respective ducted propeller rotates, is located above and aligned with an upper surface of the respective front wing or aft wing.

Preferably, the flaps may assume a position corresponding to the lower second operational position or another operational position between the first and the second operational positions, in which the ducted propellers provide only vertical thrust downwardly, which provides the aircraft with a vertical take-off and landing (VTOL) capability. In the upper first operational position or another operational position between the first and the second operational positions, in which the flaps extend in the longitudinal direction or at a minimum angle with respect to the longitudinal direction of the aircraft, the operating ducted propellers provide maximum forward thrust for the aircraft. The flaps operate not only for controlling the thrust direction of the propulsion engines or propulsion modules, but also as flight control surfaces influencing the movement of the aircraft in the air based on the usual aerodynamic principles.

In the shown embodiment of FIG. 2, the flaps are provided with propulsion modules, into which plural propulsion engine in the form of a ducted propeller are integrated. For example, such a propulsion module may include three such propulsion engines, so that each flap is provided with three propulsion engines in the form of a respective ducted propeller. In this case, the aircraft is provided with overall thirty-six propulsion engines.

FIG. 4*a*) shows a schematic view on such a propulsion module 230 having an array of three propulsion engines 232*a*, 232*b* and 232*c* and being mounted to a flap 234, which may be anyone of the flaps 210, 212, 214 and 216 shown in FIG. 2.

In the shown embodiment of FIG. 3, the flaps each are provided with one respective propulsion engine in the form of a ducted propeller. Accordingly, the aircraft is provided with overall thirty-six propulsion engines.

FIG. 4*b*) shows schematically such a flap 234 with the propulsion engine 232 mounted thereto. The flap 234 may be anyone of the flap 210, 212, 214 and 216 of the FIG. 3.

Figure 4:
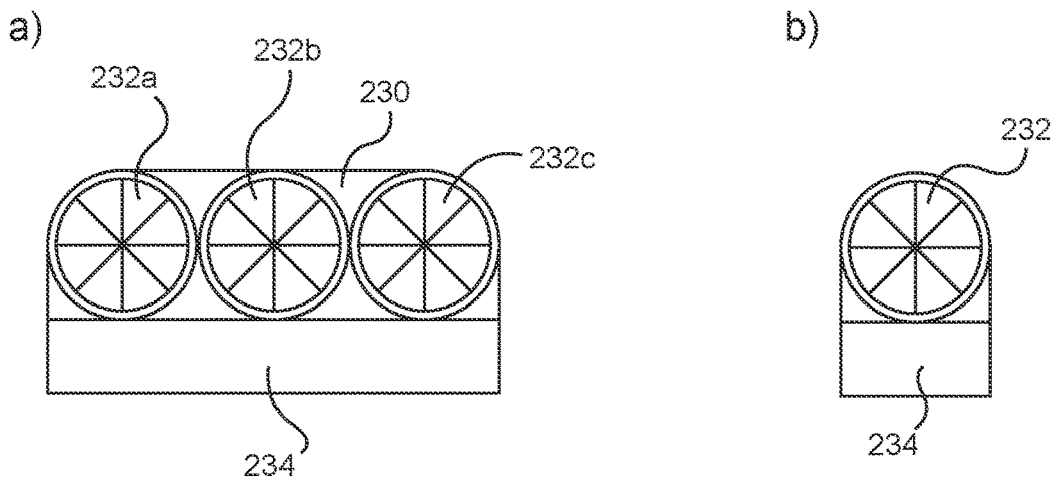
FIG. 4 shows schematically in sub-FIG. 4a) and sub-FIG. 4b) two types of lift/thrust units, having three propulsion engines mounted to or integrated with a flap, as shown in FIG. 4a) or having one propulsion engine mounted to or integrated with a flap, as shown in FIG. 4b).

FIG. 4 shows the respective flap 234 with the propulsion modules 230 or the propulsion engine 232 schematically in a view from the rear of the aircraft.

Figure 5:
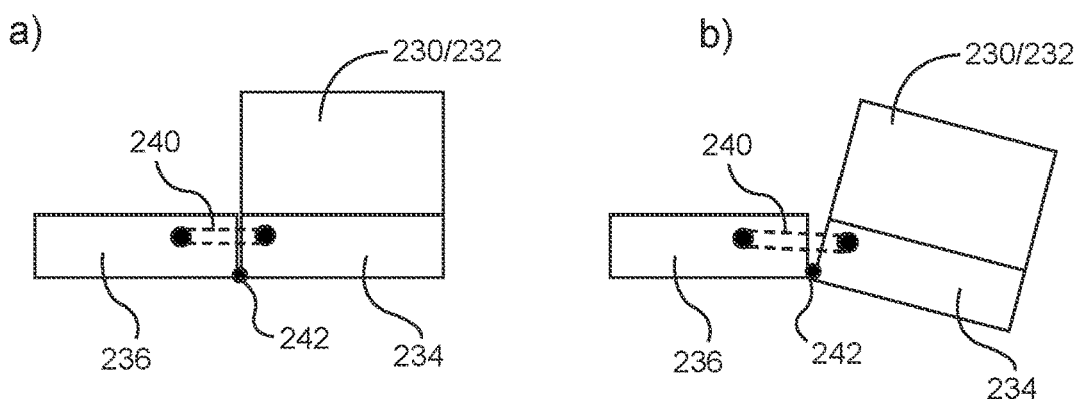
FIG. 5 shows in sub-FIGS. 5a), 5b), 5c) and 5d) the lift/thrust units of FIG. 4 in side views together with a respective aircraft wing, in four different deflection angles of the flap with respect to the wing.

FIG. 5 shows schematically side views of the respective wing 236 of the aircraft, which may be anyone of the wings 202, 204, 206 and 208 of FIGS. 2 and 3, and the respective flap 234, to which the respective propulsion module 230 or the respective propulsion engine 232 is mounted, for different deflection angles of the flap with respect to the wing. For example, a minimum or zero deflection angle as illustrated in FIG. 5*a*) provides for maximum forward thrust for the aircraft, and a maximum deflection angle or deflection angle of 90 degrees as illustrated in FIG. 5*d*) provides maximum or only vertical thrust downwardly for achieving a vertical take-off and landing (VTOL) capability for the aircraft. The maximum deflection angle may even be greater than 90 degrees, so that thrust in a direction having a downward component and a backward component is provided.

The intermediate deflection angles of the flap as illustrated in FIGS. 5*b*) and 5*c*) provide thrust in a direction having a downward component and a forward component, as follows from the respective deflection angle. This deflection angle preferably can be varied continuously between the minimum and maximum deflection angles. A suitable flap actuator or flap actuator arrangement acting between the respective wing 236 and the respective flap 234 is schematically represented in FIG. 5 by the element 240. A suitable pivoting joint or pivoting joint arrangement pivotably linking the flap 234 with the wing 236 is schematically represented in FIG. 5 by the element 242.

In FIG. 3, the lift/thrust units, each having a flap 234 and a propulsion engine 232 and a flap actuator or flap actuator arrangement 240 as illustrated in FIG. 4*b*) and FIG. 5, have associated identification numbers shown in inserts in FIG. 3, which are associated to the wings and canards. The six flaps or lift/thrust units 214 of the canard wing 206 have assigned the identification numbers 1.1 to 1.6. The six flaps or lift/thrust units 214 of the canard wing 208 have assigned the identification numbers 2.1 to 2.6. The twelve flaps or lift/thrust units 210 of the main wing 202 have assigned the identification numbers 3.1 to 3.12. The twelve flaps or lift/thrust units 212 of the main wing 204 have assigned the identification numbers 4.1 to 4.12.

The identification numbers 1.1, 2.1, 3.1 and 4.1 identify the respectively most inner flap or lift/thrust unit adjacent or near the fuselage 203, and identification numbers 1.6, 2.6, 3.12 and 4.12 identify the outmost flap or lift/thrust unit having a maximum distance from the fuselage 203, and the other flaps or lift/thrust units and their positions along the respective wing or canard are correspondingly identified by the four identification number inserts in FIG. 3.

In both embodiments, the propulsion engines 232 or propulsion modules 230 arranged on the wings 202, 204, 206 and 208 and the flap actuators 240 associated to the flaps 234 of the four arrays of plural flaps 210, 212, 214 and 216 are aircraft devices like the elements 14, 16, 18 and 20 of FIG. 1, which are controlled by the flight control computer system 12.

According to preferred embodiments, all these aircraft devices are electric aircraft devices, which are powered by electric power provided by plural electric storage batteries of the aircraft. The aircraft devices are electrical loads of an electrical power system of the aircraft and the electric storage batteries are electrical power sources of the electrical power system of the aircraft. The electrical power system has an electrical power distribution network, which is configured to connect the electrical power sources with the electrical loads, such that each electrical load or aircraft device can be driven by at least one associated electrical power source or electric storage battery via at least one associated power lane of the electrical power distribution network. The present invention relates to an electrical power system and its electrical power distribution network for an aircraft, e.g. such as the electrical power system and its electrical power distribution network as referred to in the context of the illustrative embodiments of FIGS. 1 to 5.

Figure 6:
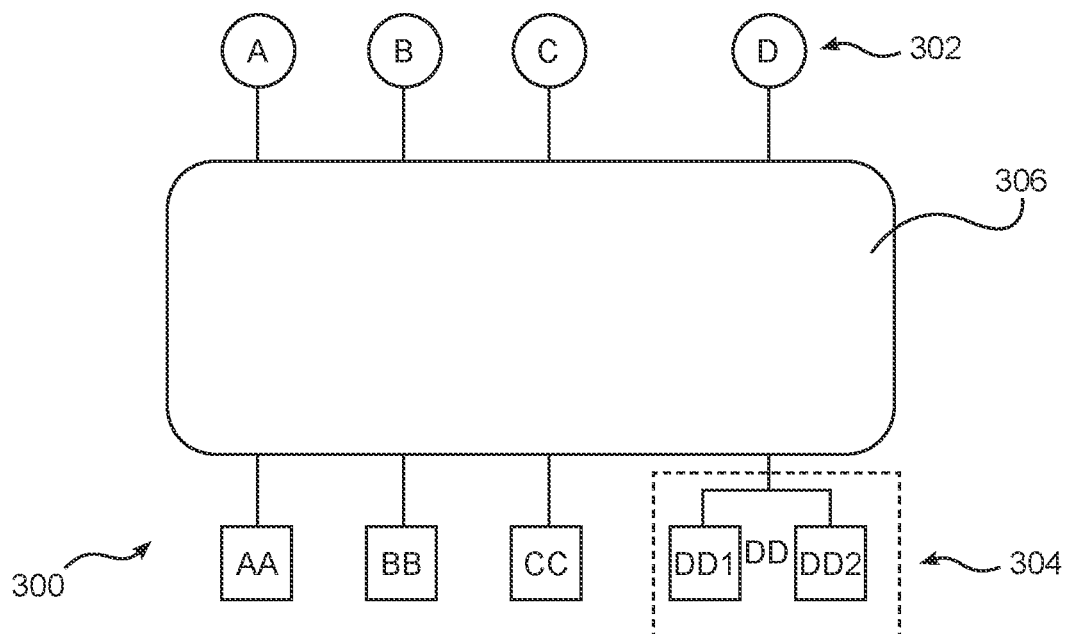
FIG. 6 shows schematically a general electrical power system of an aircraft.

FIG. 6 shows schematically such an electric power system 300 as provided by the invention. The electrical power system has plural, in the shown schematic embodiment four electrical power sources or electric storage batteries 302 individually denoted as sources A, B, C and D and plural electrical loads, in the present case five electrical loads 304 individually denoted as loads AA, BB, CC, DD1 and DD2, which are typically electrical powered aircraft devices as referred to in the foregoing. The electrical power sources 302 and the electrical loads 304 are connected or connectable via an electrical power distribution network 306, shown only symbolically in FIG. 6. Each of the electrical loads may represent plural electrical loads connected in parallel with the electrical power distribution network 306 as illustrated by the electrical loads DD1 and DD2, which commonly form an electrical load DD to be powered via the electrical power distribution network.

Figure 7:
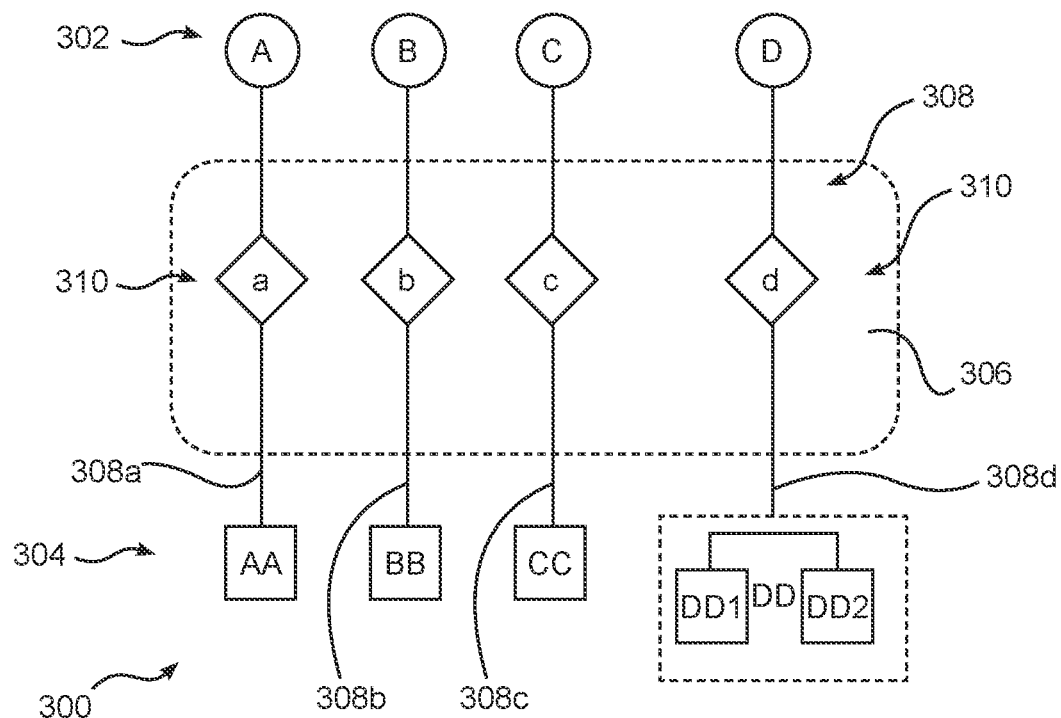
FIG. 7 shows schematically an electrical power system of an aircraft having a power distribution network exemplifying a first conventional approach.

According to a conventional approach, the electrical power distribution network 306 would be realized as a segregated network having independent power lanes, in the present example four independent power lanes 308*a*, 308*b*, 308*c* and 308*d* as shown in FIG. 7, each power lane connecting one particular of the electrical power sources with one particular of the electrical loads. The power lanes each are provided with a respective power link a, b, c and d of a set of power links 310, which typically are Circuit Protection Devices also known as "CPDs", which shall protect the downstream wiring of the respective power lane and the downstream load from damages, if a short circuit occurs. For conciseness, the power links 310 are addressed as "CPDs" in the following, but only in the sense of a non-limiting example. Such CPDs can easily be selected by the skilled person to be appropriate for the wiring or power lane to be protected. CPDs having usual tripping time constants, e.g. in the order of about 10 ms, may be used, as is appropriate for the power lanes and particular circumstances of the particular power distribution network to be protected.

A segregated network has the substantial advantage to be fault resilient to a certain extent, since the power distribution network is segregated into the separate power lanes 308, so that an electrical fault on one power lane cannot affect another power lane. In the illustrated example FIG. 7, an electrical fault on load BB will cause a power interruption on power lane 308*b*, until CPD b isolates the electrical fault. The other power lanes are unaffected.

The disadvantage of a segregated network is that load sharing is not possible. If the loads would not be of equivalent power consumption then there would be a non-uniform demand on the electrical power sources, so that the storage batteries would be discharged unevenly. This can limit the performance of an electrically powered aircraft.

Figure 8:
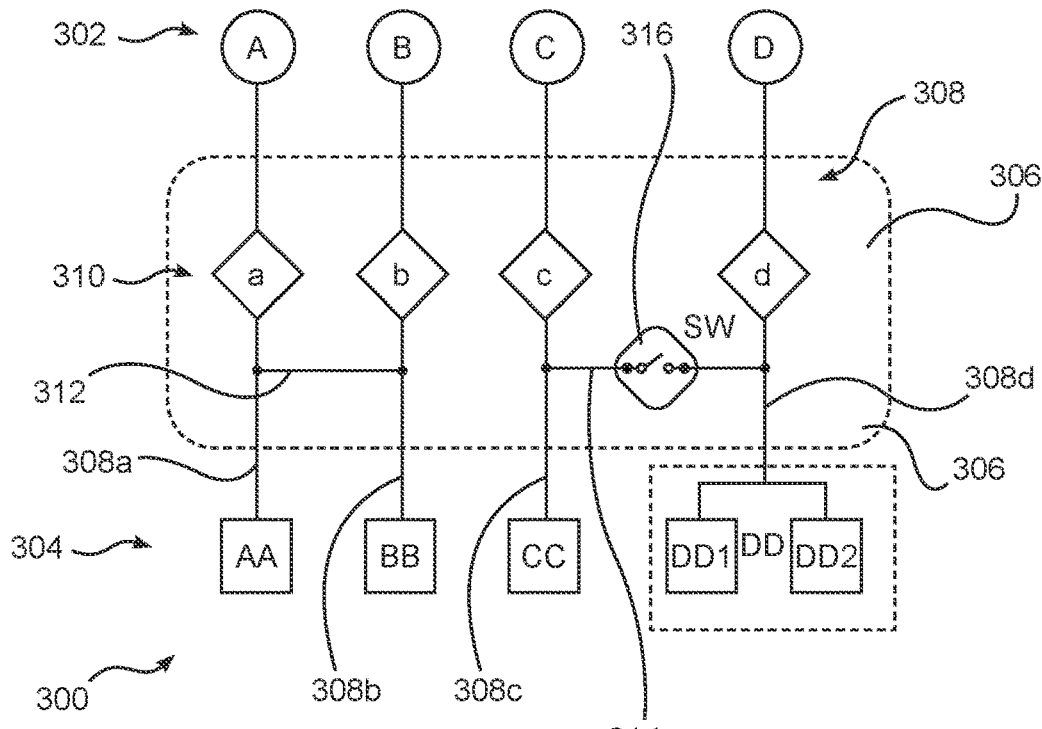
FIG. 8 shows schematically an electrical power system of an aircraft having a power distribution network exemplifying a second and a third conventional approach.

Any alternative network utilizing unification rather than segregation would be better for load sharing. A corresponding unified network is schematically illustrated in FIG. 8 by the left network portion formed by power lanes 308*a* and 308*b* with the electrical power sources A B, the electrical loads AA and BB, and the CPDs a and b. These two power lanes are connected by a connecting lane 312, so that load sharing across power sources A and B with respect to their associated electrical loads AA and BB is realized. However, any electrical fault occurring with respect to one of these power lanes will also affect the other power lane and will propagate across the network and cause a power interruption on all lanes connected with the lane directly affected by the electrical fault, until the fault is isolated.

Accordingly, in the show example an electrical fault on load BB will cause a power interruption on power lane 308*b* as well as on power lane 308*a* and could even not be isolated, since the connecting lane 312 is arranged on the downstream side of the CPDs a and b. Only if the connecting lane 312 would connect the power lanes 308*a* and 308*b* on the upstream side of the CPDs a and b as illustrated in FIG. 9, the assumed electrical fault on load D can be isolated by CPD b so that thereafter load AA could be provided with electrical power from power sources A and B.

Having a simultaneous power interruption across an entire electrical power distribution network is typically not acceptable for safety/critical electrical power distribution networks like such networks for aircrafts.

There are three other disadvantages: i) Because the electrical fault is being supplied by both sources A and B, more energy will be released, ii) because the electrical fault is being supplied by both sources A and B, the CPD, if provided at the downstream side of the connecting lane 312, has to interrupt at a higher fault current, iii) depending of the capacity of the power sources of the network and the reaction time of the CPDs, other CPDs may erroneously isolate as well, which will lead to a loss of energy supply not only to load BB but also to load AA, although load AA had not faulted.

Figure 9:
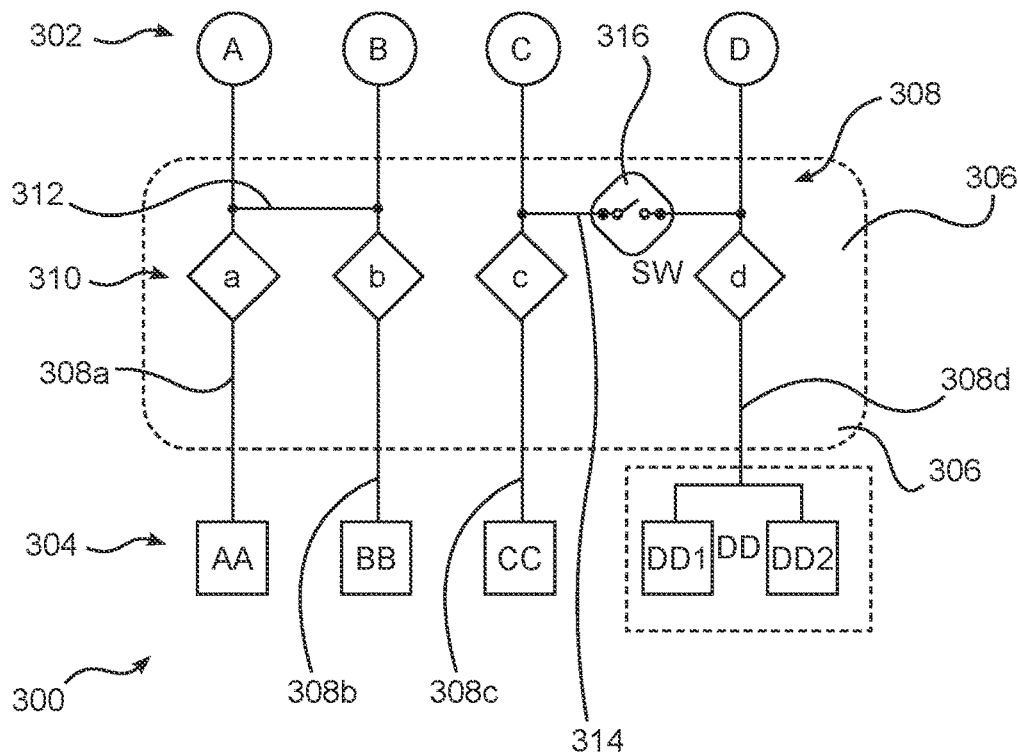
FIG. 9 shows schematically an electrical power system of an aircraft exemplifying variants to the conventional approaches of FIG. 8.

FIGS. 8 and 9 illustrate not only a unified network, but also a switchable network, which is a kind of hybrid solution, which is employed in conventional aerospace technology today. Such a network uses switches to provide for unification as well as for segregation, depending on the situation. According to FIGS. 8 and 9, power lanes 308*c* and 308*b* are connected via a connecting lane 314 having included a power link 316 in the form of a switch SW, which are located downstream of the CPDs c and d according to FIG. 8 and upstream to the CPDs c and d according to FIG. 9.

Because faults that occur while the switch SW is closed are able to propagate between the power lanes, the action of closing the switch SW brings a significant reduction in safety margin. Therefore, according to conventional airspace technology, the switch SW is only closed following failures, when the system is operating in a degraded mode, so that the benefits of unification are not realized in normal operation. An example for such an introduction of unification in response to a failure is a failure of electrical power source D, so that load DD or loads DD1 and DD2 would receive no electrical power from source D via power lane 308*d* anymore in the segregated state of the power distribution network 306. By closing power link 316 or switch SW, these loads could be provided with electrical power from power source C, which then would have to drive load CC together with load DD.

Figure 10:
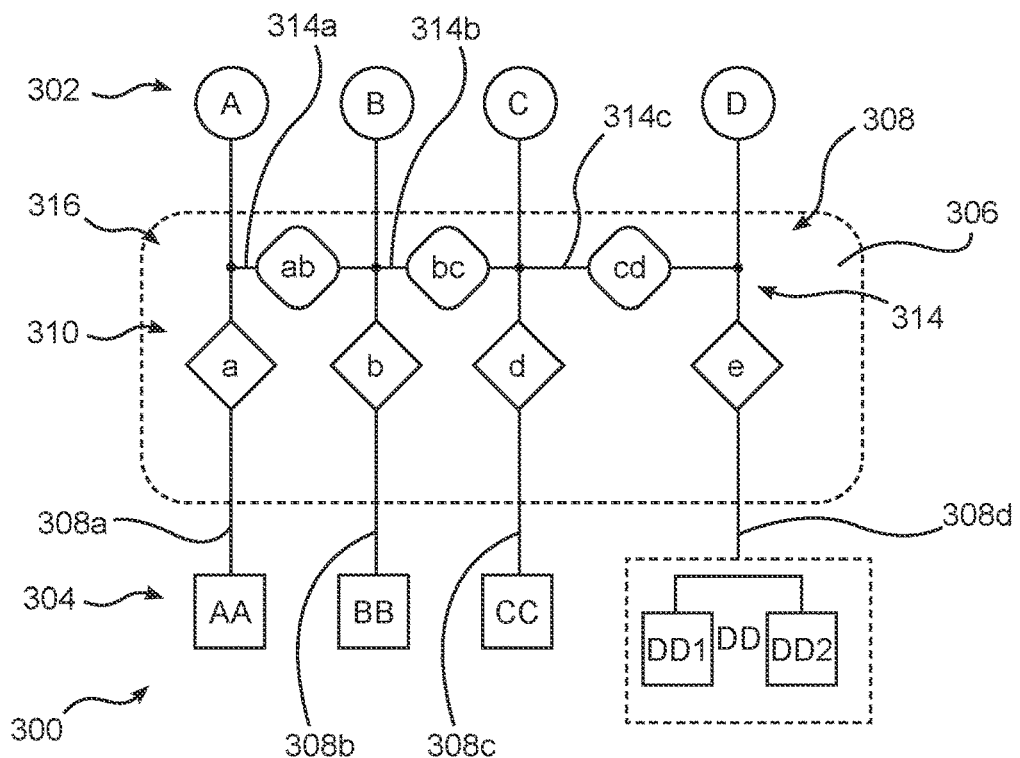
FIG. 10 exemplifies schematically a suitable line topology for the power distribution network of an electrical power system of an aircraft, on basis of which the present invention may be implemented.

Major advantages of network segregation as well as of network unification can be achieved in a favorable and synergistic manner according to two alternative approaches proposed herewith and denoted as "FIRST APPROACH" and "SECOND APPROACH", as described in the following, based on illustrative non-limiting network topologies shown as illustrative examples in FIGS. 10 to 15. In the following description, the following terminology is used: The power lanes 308 connecting a respective electrical power source with a respective electrical load, via a respecting power link like a CPD, namely the power lanes 308*a*, 308*b*, 308*c* and 308*d* of FIG. 10 are denoted as "power lanes of a first kind". These power lanes of the first kind have included a respective one of the mentioned power links 310, namely one of the power links a, b, c and d in the shown example, typically realized as CPDs, as explained. These power links 310 are denoted as "power links of a first kind". For conciseness, these power links are again addressed as "CPDs" in the following, but only in the sense of a non-limiting example.

According to the illustrative example of FIG. 10, these power lanes of the first kind are pairwise connected with each other by connecting lanes 314, namely individual power lanes 314a, 314b and 314c, which each have included a respective power link ab, bc and cd of the set of power links 316. These connecting lanes 314 or 314a, 314b and 314c are denoted as "power lanes of a second kind" and their power links ab, bc and cd are denoted as "power links of a second kind". According to FIG. 10, this power links of the second kind 316 individually denoted as ab, bc and cd are provided on the upstream side of the power links. Depending on the application and the approach to be implemented, these power links of second kind may be CPDs, switches, SSPCs (Solid-State Power Controllers) and the like. Preferred embodiments according to the two proposed approaches use either SSPCs or switches as power links of the second kind, so that in the following, for conciseness, these power links of the second kind are denoted as "SSPC/SW" or "SSPCs/SWs" (SW standing for switch), but only in the sense of non-limiting examples.

Figure 11:
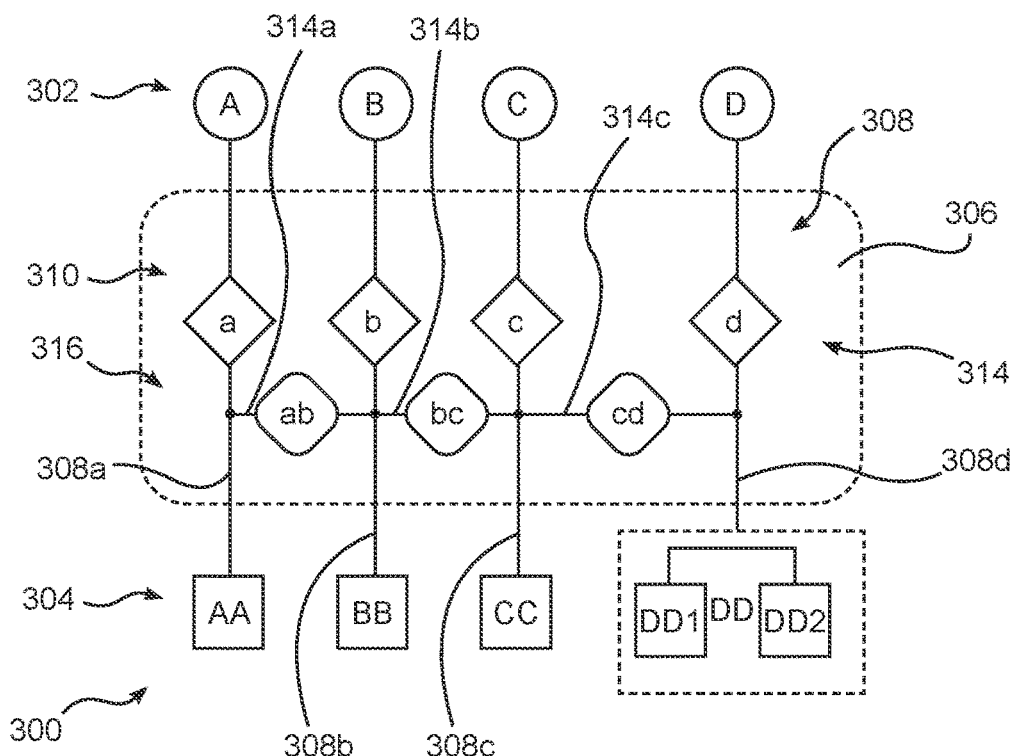
FIG. 11 exemplifies schematically a first variant of the network topology according to FIG. 10.

FIG. 11 shows an alternative configuration, namely that the power lanes of the second kind or SSPCs/SWs 316 (ab, bc, cd) are located on the downstream side of the power links of the first kind or CPDs a, b, c and d.

Figure 12:
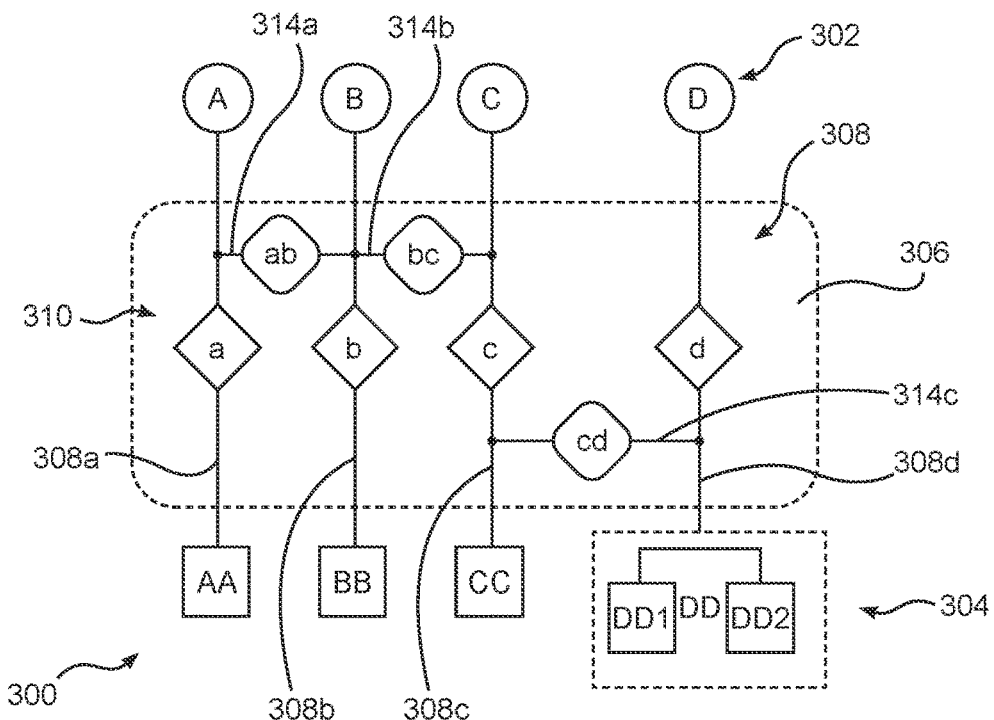
FIG. 12 exemplifies schematically a second variant of the network topology according to FIG. 10.

One may also choose to provide one or plural of the SSPCs/SWs on the upstream side of the CPDs of the associated power lanes of the first kind and to provide one or plural of the power links of the second kind on the downstream side of the power links of the first kind of the associated power lanes of the first kind, as illustrated in FIG. 12. The power lanes of the second kind 314a, 314b are located with their SSPCs/SWs ab and bc on the upstream side of the CPDs a, b and c and the power lane of the second kind 314c with its SSPC/SW cd is located on the downstream side of the CPD c and d. The network topologies of FIGS. 10, 11 and 12 enable load sharing or partial load sharing across power sources A, B, C and D with respect to the electrical loads AA, BB, CC and DD in a line topology, since the loads are connected or connectable via the SSPCs/SWs ab, bc, cd included in a kind of load sharing connection line formed by the power lanes of the second kind 314a, 314b and 314c.

Figure 13:
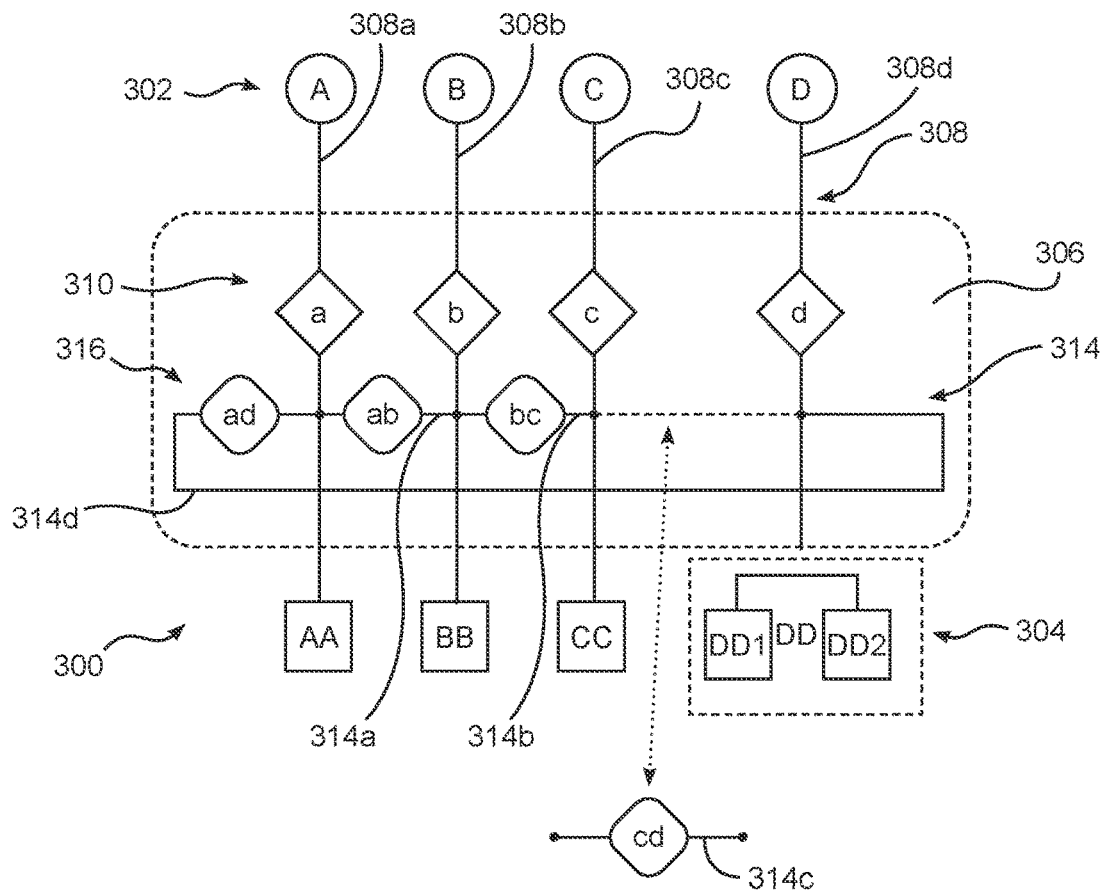
FIG. 13 exemplifies schematically a suitable ring topology for the power distribution network of an electrical power system of an aircraft, on basis of which the present invention may be implemented.

Even more beneficially is a connection of the connecting lanes of the second kind with their SSPCs/SWs in a ring configuration, so that load sharing or partial load sharing across the power sources A, B, C and D with respect to the loads AA, BB, CC and DD in a ring typology is enabled, as illustrated in FIG. 13. The connection between the power lanes of the first kind 308c and 308d is represented by a dotted line in FIG. 13, for indicating that more power lanes of the first kind with their CPDs may be provided and included in the load sharing or partial load sharing via the load sharing connection ring line formed by the power lanes of the second kind. The possibility that no more power lanes of the first kind are provided, so that the power lane 314c of the second kind having included SSPC/SW cd is indicated in FIG. 13 as well.

The ring lane is closed by power lane 314d of the second kind having a SSPC/SW ad, which connects power lanes 308a and 308d of the first kind.

Figure 14:
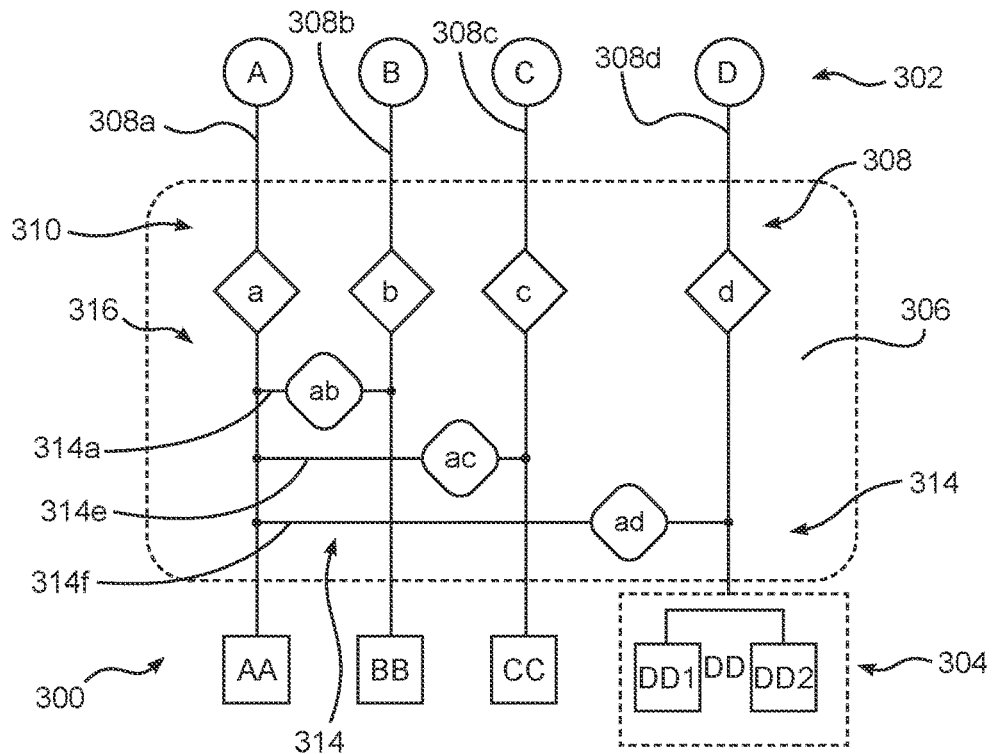
FIG. 14 exemplifies schematically a suitable star topology of the power distribution network of an electrical power system of an aircraft, on basis of which the present invention may be implemented.

Another possibility is to connect the power lanes of the first kind with their SSPCs/SWs in parallel, to form a kind of star topology for the load sharing or partial load sharing. FIG. 14 shows a non-limiting example. Here the power lane of the first kind 308a is connected or connectable with each of the other shown power lanes of the first kind via respective power lane of the second kind, namely with power lane of the first kind 308b via power lane of the second kind 314a, with power lane 308c of the first kind via power lane of the second kind 314e and with power lane of the first kind via power lane 314f of the second kind. These power lanes of the second kind each have included a respective SSPC/SW denoted as ab, ac and ad.

A disadvantage of the shown configuration is that a failure, which affects directly power lane 308a of the first kind would affect all other power lanes of the first kind as well and after isolation of this failure, no load sharing or partial load sharing would be possible anymore.

Figure 15:
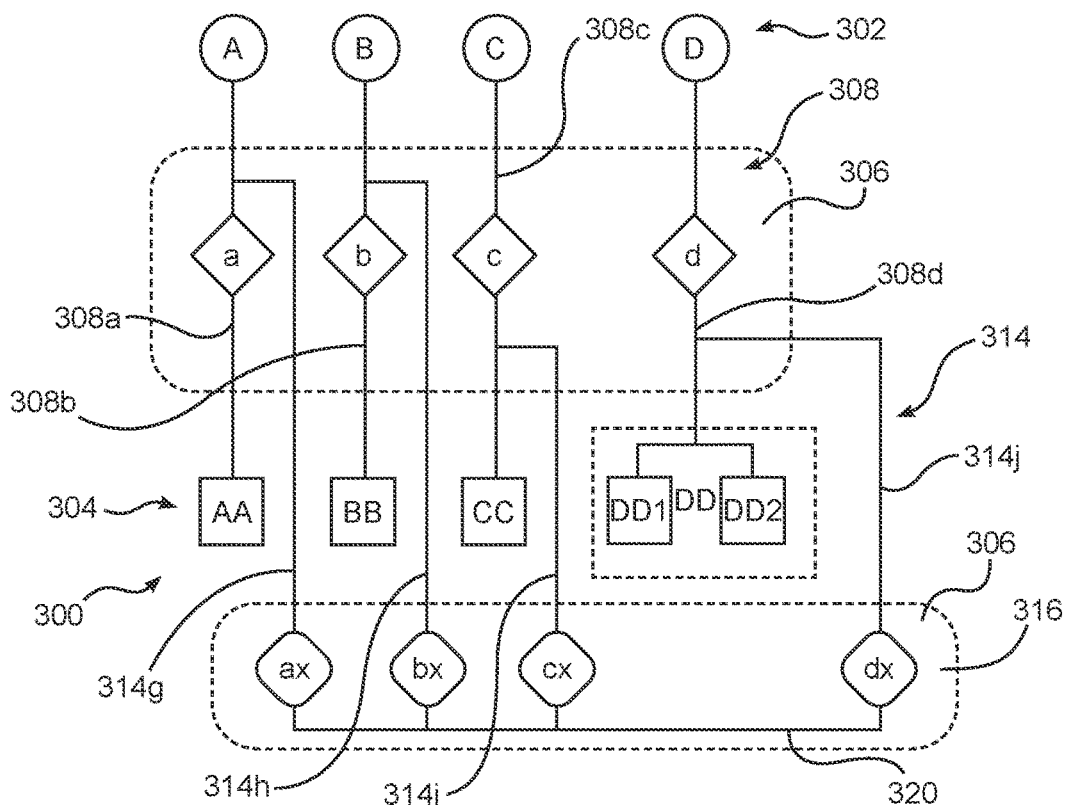
FIG. 15 exemplifies schematically a suitable star topology of the power distribution network of an electrical power system of an aircraft, which is particular favorable and on basis of which the present invention may be implemented.

Therefore, a star like load sharing configuration as shown in FIG. 15 is preferred, which uses not a power lane of the first kind as hub or center of the star configuration, but a separate connecting lane 320, which is connected or connectable with each of the power lanes 308a, 308b, 308c and 308d of the first kind via a respective power lane 314g, 314h, 314i and 314j of the second kind, which each have included a respective SSPC/SW ax, bx, cx and dx.

All these electrical power distribution network configurations or topologies are only non-limiting examples. All these topologies may be realized in combination in respective network sections of the electrical power distribution network, and other topologies known to the skilled person may be implemented as well, such as a mesh topology as well as topologies as such known from US 2020/0010187 A1.

Now the configuration of the electrical power distribution network and the operation of the electrical power distribution network according to the mentioned preferred proposed approaches will be described.

First Approach

According to the mentioned first approach, it is provided for a unified electrical power distribution network 306 for the normal operation, which can switch over in a very fast manner to a segregated or partially segregated electrical power distribution network, if an electrical failure occurs. To this end, the power links of the second kind 316 are realized as very fast acting solid-state switches or very fast acting solid-state CPDs or similar or more preferred, as Solid-State Power Controllers (SSPCs) or load channels of one or plural Solid-State Power Controllers (SSPCs) of the electrical power distribution network.

These power links of the second kind, preferably SSPCs, can be in a conducting state in normal operation and therewith will be transparent in terms of load sharing. However, these power links of the second kind are configured to isolate extremely fast, for example within 10 to 20 $\mu$s, to introduce segregation, if an electrical fault is detected. In the following, these power links of the second kind are only addressed as "SSPCs", as a non-limiting example. Generally, it is preferred that isolation times of about 100 $\mu$s, more preferred of below 100 $\mu$s and most preferred of about 10 to 20 $\mu$s are achieved by the SSPCs. Slower isolation times, e.g. in order of 1 ms, shall not be excluded, however.

A SSPC is a well-known electronic device consisting of one or plural conducting channels or load channels, current measurement means for each load channel and logic means implemented in software or hardware, such that the load channel can be switched off if a certain current threshold is exceeded or possibly in response to one or plural other trip conditions. Such current thresholds and trip conditions can easily be selected or defined by the skilled person, based on the design of the power distribution network and the nature of the power sources and electrical loads and therefore the maximum current values and other electric conditions to be expected for normal fault free operation. The skilled person will take appropriate safety margins into account.

Therewith, an electrical power distribution network is achieved, which utilizes unification and benefits from the advantages of load sharing on the one hand, but is also fault resilient and safe on the other hand.

For example, considering electrical power sources A and B, electrical loads AA and BB, power lanes 308a and 308b of the first kind with CPDs a and b and power lanes 314a of the second kind with SSPC ab of FIG. 10 and FIG. 11, the SSPC ab is inserted in parallel between power lanes 308a and 308b. In the network's normal operation state, this SSPC is in its conducting state, so that load AA can be supplied equally by source A and source B, and load BB can also be supplied equally by source A and source B. The same applies for the other power lanes of the first kind and the other power lanes of the second kind with their SSPC according to FIGS. 10 and 11 as well as for all corresponding power lanes according to FIGS. 12 to 15, which enable load sharing in the normal operation of the electrical power distribution network but isolate an electric fault, which could occur, in a very fast manner by introducing appropriate segregation.

Preferably, the fault isolation is achieved according to plural subsequent fault isolation stages, preferably three fault isolation stages. The reason is that an electric failure that occurs could have the result that more SSPCs than needed for the fault isolation could switch over from their conducting state to their non-conducting state.

A first fault isolation stage and a second fault isolation stage can again be explained and illustrated on basis of power sources A and B, electrical loads AA, BB, their associated power lanes 308a and 308b of the first kind having a respective CPD a and b and the associated power lane 314a of the second kind having the SSPC ab, e.g. according to FIGS. 10 and 11.

The first isolation stage results in the segregation of this network portion into the power lanes of the first kind. If an electric fault occurs on load BB, then the SSPC ab will see an increased current due to power source A supplying the electric fault, and will be isolated extremely fast by switching over to its non-conducting state. Now the fault has been isolated to power lane 308b, and power lane 308a can continue normal operation. Load AA experiences little or no power interruption.

Now the electric fault is only affecting power lane 308b, so that fault isolation within this lane can be achieved according to the second fault isolation stage. Since the electrical fault is only affecting power lane 308b of the first kind, the urgency of fault isolation is decreased. Since the electric fault is only supplied with electric energy from source B, less energy is released at the fault and CPD b is capable of safely interrupting the fault current. CPD b can safely isolate a fault in the form of an assumed short circuit.

An important advantage of the proposed approach is that the conventional concept of "selectivity" for coordinating multiple CPDs in series between a source and a load such that the CPDs isolate in the correct order is not relevant or utilized.

The SSPC or SSPCs can be of any speed and no coordination with other SSPCs and CPDs is required, except that the power links of the second kind, preferably SSPCs, should be fast enough to allow a tripping of the respective SSPC before the power links of the first kind or CPDs in the power lanes of the first kind could trip. Providing for very fast power links of the second kind is also favorable for limiting the duration of a respective power interruption. The power links of the second kind or SSPCs do not isolate themselves an electric power from a load, but only segregate power lanes of the first kind from each other, so that the coordination of the power links of the second kind or SSPCs is not as critical as that of certain CPDs on the network according to prior art approaches.

The third fault isolation stage provides for restoration of the network unification except for maintaining a certain segregation needed for isolating the electric fault. This fault isolation stage is relevant for larger networks having more power lanes as considered in the context of sources A and B and loads AA and BB shown in FIGS. 10 to 15.

In such an extended power distribution network 306, there is a high likelihood that in the first fault isolation stage multiple power links of the second kind switch over to their non-conducting state. This applies in particular to SSPCs due to their high sensitivity. Because of this, load sharing may have been lost even between healthy power lanes of the first kind.

For example, it could happen that in the networks 306 of FIGS. 10 and 11 SSPC cd between power lanes 308c and 308d switches to the non-conducting state, although not power lane 308c of the first kind is affected by the electric fault, but power lane 308b of the first kind. For isolating this electric fault, only SSPCs ab and bc must switch over to the non-conducting state, so that SSPC cd can switch back or can be switched back to the conducting state as soon as power lane 308c of the first kind is segregated from the faulty power lane 308b of the first kind by the switching of SSPC bc to the non-conducting state.

In case of the network topology of FIG. 10, assuming that an electric short occurs in electrical load BB, even the other SSPCs ab and bc may return to the conducting state after the fault isolation within power lane 308b of the first kind, according to the second fault isolation stage, namely the switching over of the CPD b of this power lane to its non-conducting state, which interrupts the fault current.

Having the power lanes of the second kind with their power links of the second kind or SSPC on the upstream side of the power links of the first kind or CPDs appears to be favorable in view of the possibility that faults occur in the electrical loads. In such a case, all electrical power sources may continue to contribute to the provision of electrical power and load sharing after the restoration of the unification according to the third fault isolation stage.

Having the power lanes of the second kind with their power links of the second kind or SSPCs on the downstream side of the power links of the first kind or CPDs appears to be favorable in view of the possibility that electrical power sources could become faulty. In such a case, all electric loads can continue to be provided with electrical power after the restoration of the unification according to the third fault isolation stage, on basis of load sharing across the remaining electrical power sources.

Since both these possibilities have their advantages, a mixed configuration as illustrated in FIG. 12 may be used.

However, it shall not be ruled out that power lanes of the second kind having a respective power link of the second kind are provided on the upstream side as well as on the downstream side of the power links of the first kind. Further, one could combine the proposed first approach with the conventional hybrid approach, namely to provide fast acting power links of the second kind, in particular, SSPCs, on one of the upstream side and the downstream side and conventional switches SW or power links 314 as shown in FIGS. 8 and 9 on the other of the upstream side and the downstream side, which are in their disconnecting state in the normal operation and are selectively switched to their conducting state in the course of the third fault isolation stage.

The third fault isolation stage may be conducted independently by the individual SSPCs, under the control of their respective logic means, based on measured electrical conditions of their load channels. Alternatively, a centralized controller of the power distribution network may control the SSPCs for effecting the third fault isolation stage, e.g. based on status data from the CPDs and the SSPCs and possibly measured electrical conditions of the network.

The preceding explanation of the three fault isolation stages applies analogously to the other network topologies of FIGS. 10 to 15. After accomplishment of the second fault isolation stage, all SSPCs between all power lanes of the first kind except for the faulty power lane of the first kind can reset to a conducting state, in order to reintroduce load sharing and to turn the network to a nearly normal operating state. Due to achieved fault isolation, this operating state of the network may be denoted as electrical failure mitigating operation mode of the network. Depending on the location of the SSPCs on the downstream or upstream side of the CPDs, it might even be possible that all SSPCs can reset to the conducting state, since the CPD or CPDs, which effects or effect the fault isolation within the respective power lane of the first kind concerned, might be sufficient for the fault isolation.

For aircrafts as referred to in the context of FIGS. 1 to 5 and generally for so-called eVTOL applications, which employ multiple power sources and distributed electric propulsion units (EPUs) or lift/thrust unit as electrical loads, it is advantageous to allocate the EPUs to power lanes in a symmetrical and distributed manner with respect to the geometry of the aircraft, so that the loss of a power lane has minimal impact on vehicle controllability. This can be achieved by ensuring that a single power lane, in case of a network configuration as discussed a single power lane of the first kind, supplies well-distributed EPUs rather than adjacent EPUs.

Figure 16:
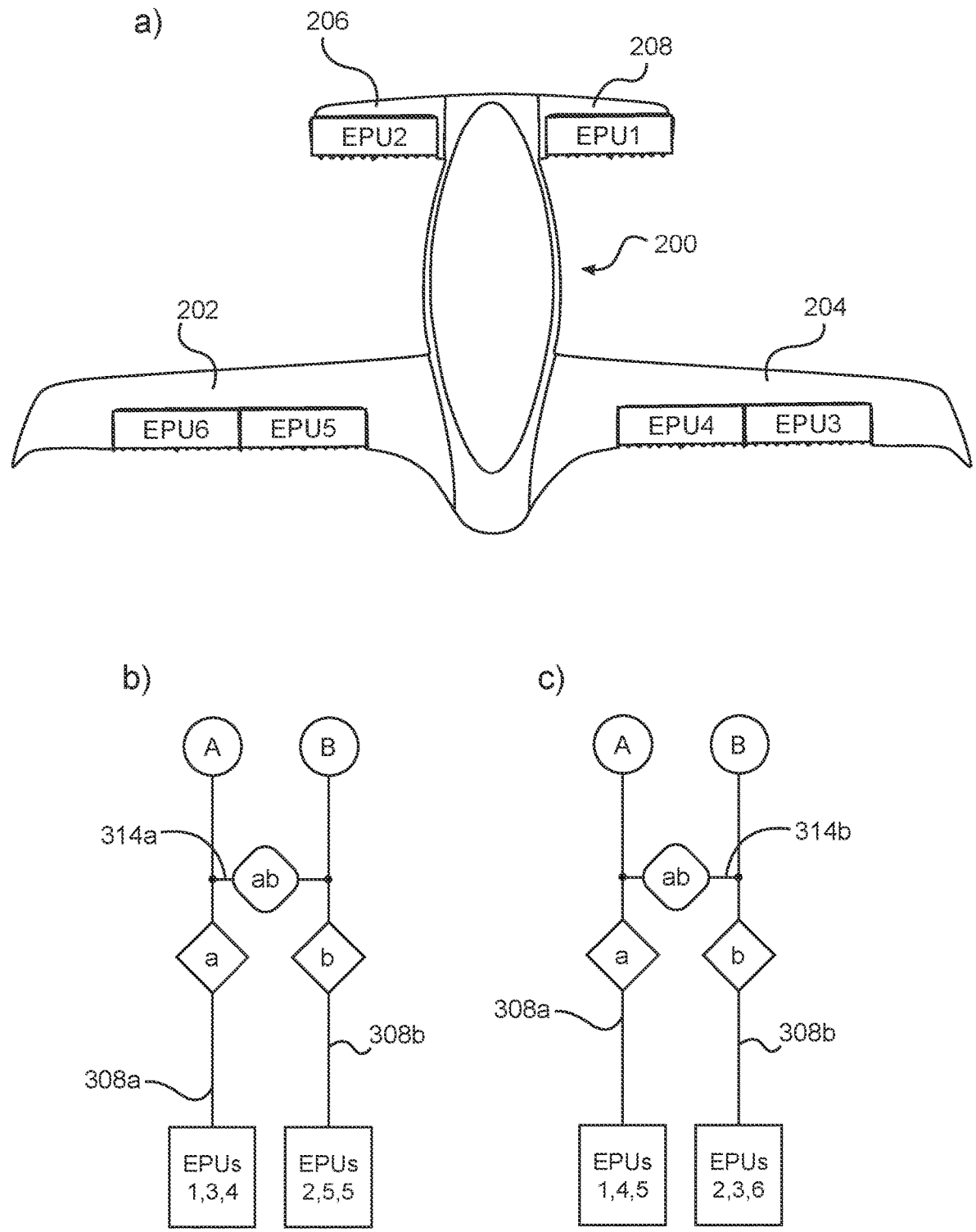
FIG. 16 shows in subFIG. 16a) schematically a simplified version of the canard-type aircraft according to FIG. 2, and exemplifies in subFIG. 16b) an undesired configuration of the electrical power system of the aircraft and in subFIG. 16c) a desired configuration of the electrical power system of the aircraft.

FIG. 16 shows in FIG. 16a a simplified schematic version of the aircraft according to FIGS. 2 and 3 having only 6 EPUs, namely EPU 1 and EPU 2 at the front wings or canards and EPU 3, EPU 4, EPU 5 and EPU 6 at the rear wings. Each of these EPUs may represent a unit comprising plural propulsion engines.

FIG. 16b illustrates schematically an allocation, which is undesirable, because a fault on one power lane affects adjacent EPUs and affects asymmetrical EPUs, with the line of symmetry being the vehicle roll axes. Either EPUs 1, 3, 4 or EPUs 2, 5, 6 are affected, EPUs 1, 3 and 4 being located at the front and aft wings on the right vehicle side, EPUs 3 and 4 being located adjacent to each other on the right aft wing, and EPUs 2, 5, 6 being located on the front and aft wings on the left vehicle side, EPUs 5 and 6 being located adjacent to each other on the left rear wing.

FIG. 16c illustrates an schematically allocation, which is desirable, because fault on one power lane of the first kind doesn't affect adjacent EPUs and provides better symmetry of failing EPUs (with the line of symmetry being the vehicle roll axes). Only one of the two EPUs 1 and 2 at the left and right front wing will be affected and only one respective EPU on the left and right aft wings, namely either EPUs 4 and 5 or EPUs 3 and 6 will be affected, if only one of the power lanes 308a and 308b becomes faulty.

The concept illustrated based on FIGS. 16 and 16c may be analogously applied to the EPUs or lift/thrust units or propulsion engines and flight actuators of the illustrated embodiments of FIGS. 2 and 3.

Generally speaking, the skilled person will be able to provide a sufficient number of aircraft devices of a common type, in particular lift/thrust units, and to arrange these aircraft devices in a suitable configuration on the aircraft, in particular its wings, and to assign these aircraft devices in a suitable manner to the power lanes, in particular power lanes of the first kind of the electrical power distribution network, so that the desired resiliency against onefold or even multifold electrical failures is achieved.

For example, with reference to FIG. 3, an electric failure could result in a simultaneous failure of the lift/thrust units 3.1 and 3.6 of the left main wing 202 or/and of the lift/thrust units 4.1 and 4.6 of the right main wing 204. Therewith one or two lift/thrust units adjacent to the fuselage and one or two lift/thrust units still rather close to the fuselage would be affected, so that no or only a minor impact on the lateral balancing would occur.

For example, with reference to FIG. 3, an electric failure could result in a simultaneous failure of the outermost lift/thrust unit 1.6 of the left canard wing 206 and the outermost lift/thrust unit 4.12 of the right main wing 204, or/and of the outermost lift/thrust unit 2.6 of the right canard wing 208 and the outermost lift/thrust unit 3.12 of the left main wing 202. Again, the lateral balancing would not be affected or would not be affected very much.

The illustrated principle of achieving resiliency against failures based on the proposed approach can of course also be applied to other kinds of aircraft than the aircrafts shown in FIG. 2, FIGS. 3 and 16a), and also to completely different kinds of aircraft, which have such a number of lift/thrust units, propulsion engines, flaps and the like, that not all these aircraft engines are needed for maintaining the flight capability and controllability of the aircraft. For achieving resiliency against onefold, twofold or multiple electric failures, the skilled person will be able, when implementing the invention, to assign the various aircraft engines in such a manner to individual power lanes of the electrical power distribution network, so that the impact of such onefold, twofold or multiple bus faults is minimized.

Second Approach

According to the mentioned second approach, it is provided for a partially unified and partially segregated electrical power distribution network 306, for the normal operation and preferably also for a failure mitigating operation mode the electric power distribution network. According to this approach, the network sequentially switches between a plurality of different partial load sharing configurations, which are associated to a respective of plural partial load sharing modes. The electrical power distribution network assumes these partial load sharing modes and therefor their partial load sharing configurations sequentially in a time variable manner. Each of these different partial load sharing configurations corresponds to a different kind of partial unification and partial segregation of the network. Uniform discharge of the power sources can be achieved by this sequential, preferably periodical switching between the partial load sharing configurations.

This switching between the different partial load sharing configuration is effected by the power links of the second kind 316, which switch between their conducting state and their non-conducting state in a synchronized manner, preferably relatively slowly in comparison to tripping times of typical Circuit Protection Devices or CPDs and even more in comparison to typical tripping times of Solid-State Power Controllers (SSPCs). For example, a suitable time scale for the switching of the power links of the second kind 316 could be a switching between the conducting state and the non-conducting state in time intervals of one minute. Therefore, rather slow electromechanical or solid-state switches are suitable for realizing the power links of the second kind 316, although also other components, which allow a switching between a conducting state and a non-conducting state, could be used.

In the following, these power links of the second kind are only addressed as "SW" or "SWs", to represent a suitable switch or suitable switches, but only as a non-limiting example.

Further, as is the case according to the proposed first approach described in the foregoing, the power links of the first kind may be suitable Circuit Protection Devices or "CPDs". In the following, these power links of the first kind are only addressed as "CPD" or "CPDs", again only as a non-limiting example.

An example for the resulting partial load sharing across electrical power sources with respect to associated electrical loads in a time variable manner according to a plurality of different partial load sharing modes, which are sequentially adopted by the electrical power distribution network, can be given on basis of the ring topology of FIG. 13. Now it is assumed that the power lane 308c of the first kind and the power lane 308d of the first kind are directly connected by power lane 314c of the second kind having a switch SW as power link cd of the second kind. Correspondingly, the other power links ad, ab and bc of the second kind are switches as well, whereas the power links a, b, c and d are CPDs.

Suitable partial load sharing modes denoted as stages 1 and 2 are as follows, for example:

| Stage | Switches which are closed | Switches which are open | Sources which are loadsharing |
|---|---|---|---|
| 1 | ab, cd | bc, ad | A with B, C with D |
| 2 | bc, ad | ab, cd | B with C, A with D |

By alternating periodically between stages 1 and 2 during operation, it is guaranteed that an electrical fault will never affect more than half of the lanes. According to the two stages 1 and 2, each stage has associated the electrical power sources A, B, C and D and therewith correspondingly the electrical loads AA, BB, CC and DD to plural disjunct load sharing groups, namely in stage 1 to the disjunct partial load sharing group (A+B, AA+BB) and the disjunct partial load sharing group (C+D, CC+DD) and in stage 2 the partial disjunct load sharing group (B+C, BB+CC) and the partial disjunct load sharing group (A+D, AA+DD). These groups of the respective stage are denoted to be "disjunct groups" since the groups have no element in common.

All sources have the opportunity unity to load share with other sources either directly or, if provided, via another source.

This solution is scalable to any number of power lanes.

Other assignments of the sources and loads to various stages are possible, for example as shown in the following:

| Stage | Switches which are closed | Switches which are open | Sources which are loadsharing |
|---|---|---|---|
| 1 | ab | bc, cd, ad | A with B |
| 2 | bc | ab, cd, ad | B with C |
| 3 | cd | ab, bc, ad | C with D |
| 4 | ad | ab, bc, cd | A with D |

According to this example, each stage has assigned the sources and loads to respective common partial load sharing group, namely in stage 1 to the common load sharing group (A+B, AA+BB), in stage 2 to the common load sharing group (B+C, BB+CC), in stage 3 to the common load sharing group (C+D, CC+DD) and in in stage 4 to the common load sharing group (A+D, AA+DD).

However, no particular advantage over the first example will be achieved.

If the network criticality allows loss of more than half of the lanes at a certain point of time, then additional stages become possible, where three power lanes of the first kind participate simultaneously in the load sharing, for example as follows:

| Stage | Switches which are closed | Switches which are open | Sources which are loadsharing |
|---|---|---|---|
| 1 | ab, bc | cd, ad | A with B with C |
| 2 | bc, cd | ab, ad | B with C with D |
| 3 | cd, ad | ab, bc | A with C with D |
| 4 | ab, ad | bc, cd | A with B with D |

According to this example, each stage has again assigned the sources and loads to respective common partial load sharing group, namely in stage 1 to the common load sharing group (A+B+C, AA+BB+CC), in stage 2 to the common load sharing group (B+C+D, BB+CC+DD), in stage 3 to the common load sharing group (A+C+D, AA+CC+DD) and in stage 4 to the common load sharing group (A+B+D, AA+BB+DD).

In case that an electrical failure occurs, the respective power lane of the first kind will be excluded from the further partial load sharing for isolating the electrical fault. The partial load sharing according to plural different partial load sharing modes, which are sequentially adopted by the network, may nevertheless continue.

Assuming that source C or load CC has an electrical failure, for example the following stages could periodically be adopted by the network:

| Stage | Switches which are closed | Switches which are open | Sources which are loadsharing |
|---|---|---|---|
| 1' | ab | bc, cd, ad | A with B |
| 2' | ad | ab, bc, cd | A with D |

These stages 1' and 2', which correspond to stages 1 and 4 of the second example above, correspond to partial fault isolation load sharing modes of the power distribution network. These stages are a subset of stages 1 to 4 of the second example above, stage 1" corresponding to stage 1 and stage 1" corresponding to stage 4 thereof.

Alternatively, one could implement a permanent load sharing across the sources of the healthy power lanes of the first kind with respect to their loads in the electric failure mitigating operation mode of the power distribution network, if an electric failure must be isolated. In the present example, assuming again that source C or load CC has an electrical failure, the following fault mitigation stage could be adopted by the network adopts permanently for fault isolation, until the electrical fault is resolved:

| Stage | Switches which are closed | Switches which are open | Sources which are loadsharing |
|---|---|---|---|
| 1" | ab, ad | bc, cd | A with B with D |

Another example is given based on the star topology according to FIG. 15. The power links ax, bx, cx and dx between the connecting lane 320 serving as central node and each power lane of the first kind are again assumed to be switches. An example for suitable partial load sharing modes or stages are the following stages 1 to 6:

| Stage | Switches which are closed | Switches which are open | Sources which are loadsharing |
|---|---|---|---|
| 1 | ax, bx | cx, dx | A with B |
| 2 | ax, cx | bx, dx | A with C |
| 3 | ax, dx | bx, cx | A with D |
| 4 | bx, cx | ax, dx | B with C |
| 5 | bx, dx | ax, dx | B with D |
| 6 | cx, dx | ax, bx | C with D |

Like the other examples, this solution is scalable to any number of power lanes, and the stages can be transitioned between in any order. If the network criticality allows loss of more than the half of the lanes, then additional stages become possible where for example three lanes participate in the respective simultaneous partial load sharing instead of just two.

In case that power lane 308c fails due to a failure of source C or load CC, the following stages could be assumed periodically in the electrical failure mitigating operation mode of the network:

| Stage | Switches which are closed | Switches which are open | Sources which are loadsharing |
|---|---|---|---|
| 1' | ax, bx | cx, dx | A with B |
| 2' | ax, dx | bx, cx | A with D |
| 3' | bx, dx | ax, dx | B with D |

These stages 1", 2" and 3" are a subset of stages 1 to 6 of the example given for the normal operation, stage 1" corresponding to stage 1, stage 2" corresponding to stage 3 and stage 3" corresponding to stage 5 thereof.

Alternatively, one could again implement a permanent load sharing across the sources of the healthy power lanes of the first kind with respect to their loads in the electric failure mitigating operation mode of the power distribution network, if desired.

The transition between the various stages or partial load sharing modes of the respective implementation preferably is done by first opening the currently closed switches and then closing the switching to be closed for achieving the next stage. This guarantees that that the stage transition does not involve any reduction in safety margin. Accordingly, the switching between the stages preferably is not done directly, but only after an intermediate stage having no partial load sharing across the sources.

As considered and explained with reference to FIG. 16 and FIG. 3, loads of critical importance can be allocated in a suitable distributed and symmetric manner to the power lanes of the first kind and the wings and the fuselage of the aircraft for achieving resiliency and maintaining the vehicle controllability. This applies also in the context of the proposed second approach.

To advantage, one may provide that the various partial common load sharing groups or partial disjunct load sharing groups of the partial load sharing modes or partial load sharing stages are formed in such a manner, so that the respective loads or aircraft devices of critical importance of each respective common load sharing group or disjunct load sharing group are well-distributed in a symmetrical manner over the wings and/or fuselage of the aircraft, so that a failure in one of these groups is uncritical and does not compromise the controllability of the aircraft. In this case, it is not very important that the power distribution network notices and reacts in a very fast manner to the occurrence of an electrical fault for isolating the electrical fault and assuming the electrical failure mitigating operation mode.

There are many possibilities how this skilled person could implement the proposed concepts and approaches of the present disclosure in detail. The skilled person may also decide to implement both proposed approaches in an electrical power distribution network of an aircraft, for example by applying one of these approaches with respect to one network section and the other approach with respect to another network section. Further, if the power links of the second kind are chosen appropriately, the electrical power distribution network could be configured or configurable in agreement with both approaches, in principle.

It should be noted that terms like "electrical power source", "electrical load", "power lane", "power lane of a first kind", "power lane of a second kind", "power link", "power link of a first kind and "power link of a second kind" used in the foregoing are essentially generic terms which address certain functions in a certain technical context, without necessarily implying specific structures and specific elements to be used for realizing these functions. Therefor, it is possible that plural power links are integrated in one respective power network device. Even one or plural power links of the first kind and one or plural power links of the second kind could be integrated in one respective power network device. Such power links being integrated in a power network device could share connection ports of the power network device, for example such that one connection port of the power network device is simultaneously a connection port of a power link of the first kind and a connection port of a power link of the second kind. Such a power network device might also include power lanes or power lane sections as being integrated into the device in this sense, together with the respective power link.

An electrical power distribution network (306) of an electric power system (300) of an aircraft is operated in at least one normal operation mode such that it provides for load sharing across electrical power sources (A, B, C, D) with respect to electrical loads (AA, BB, CC, DD), wherein the electrical power distribution network (306), in case of an electrical fault, is operated in at least one electrical failure mitigating operation mode, which provides for electric fault isolation, such that a network portion of the electrical power distribution network (306) including the electrical fault is isolated from at least one other network portion of the of the electrical power distribution network.

REFERENCE SIGNS 10 flight control system
12 flight control computer system 12a, 12b, 12c flight control computer
14, 16, 18, 20 aircraft devices
22 control bus system
30b left and right sidestick apparatus
32a, 32b left and right sidesticks
38a, 38b sensor assemblies
42a, 42b connection links
200 canard-type aircraft
202 left aft wing
203 fuselage
204 right aft wing
206 left front wing
208 right front wing
210, 212, 214, 216; 234 flaps
230 propulsion module
232, 232a, 232b, 232c propulsion engines
3.1 to 3.12 lift/thrust units of left aft wing
4.1 to 4.12 lift/thrust units of right aft wing
1.1 to 1.6 lift/thrust units of left front wing
2.1 to 2.6 lift/thrust units of right front wing
236 wing
240 flap actuator
242 pivoting joint
300 electric power system
302; A, B, C, D electrical power sources
304; AA, BB, CC, electrical loads
DD1, DD2, DD "
306 electrical power distribution network
308; 308a, 308b, 308c, 308d power lanes; power lanes of a first kind
310; a, b, c, d power links of a first kind
312, 314 power lanes
316; SW power link; switch
314; 314a, 314b, 314c, 314d, power lanes of a second kind
314e, 314f, 314g, "
314h, 314i, 314j "
316; ab, bc, cd, ad, power links of a second kind
ac, ad, ax, bx, cx, dx "
312, 314, 314a, "
320 connecting lane
EPU 1, EPU 2, EPU 3, EPU 4, electric propulsion units
EPU 5, EPU 6 "

The invention claimed is:

1. An electrical power system comprising:
a plurality of electrical loads;
a plurality of electrical power sources;
a plurality of power lanes; and
an electrical power distribution network, wherein the electrical power distribution network is configured to connect the electrical power sources with the electrical loads, such that each electrical load can be driven by at least one associated electrical power source via at least one of the plurality of power lanes, and wherein the electrical power distribution network is configured to operate in at least one normal operation mode and in at least one electrical failure mitigating operation mode;
wherein the electrical power distribution network comprises a circuit switching arrangement having a plurality of switchable or interruptible power links, wherein each power link is configured to operate in a first operational mode, and is configured to operate in a second operational mode; wherein the electrical power distribution network, in the normal operation mode, provides for load sharing across electrical power sources, such that at least one group of electrical power sources of said plurality of electrical power sources commonly drives at least one associated group of electrical loads of said plurality of electrical loads via one or more of the plurality of power lanes or one or more sections of the plurality of power lanes and at least one power link associated thereto and assuming the first operational mode; and
wherein the electrical power distribution network, in the electrical failure mitigating mode, provides for electric fault isolation, such that a network portion of the electrical power distribution network including an electrical fault is isolated from at least one other network portion of the of the electrical power distribution network by at least one power link assuming the second operational mode.

2. The system of claim 1, wherein each power link has two connection ports and wherein in the first operational mode each power link is configured to connect the connection ports for transmitting power from a driving power lane of the plurality of power lanes or a driving power lane section of the plurality of power lanes connected to one of the connection ports to a driven power lane of the plurality of power lanes or to a driven power lane section of the plurality of power lanes connected with the other one of the connection ports.

3. The system of claim 2, wherein in the second operational mode each power link is configured to interrupt the connection between the connection ports for preventing the transmission of power between the driving power lane or the driving power lane section and the driven power lane or the driven power lane section.

4. The electrical power system according to claim 1, wherein the electrical power distribution network is configured to provide in the normal operation mode load sharing across all electrical power sources (A, B, C, D), such that all electrical power sources of said plurality of electrical power sources commonly drive all electrical loads (AA, BB, CC, DD) of said plurality of electrical loads via respective power lanes or power lane sections and respective power links assuming the first operational mode; and wherein the electrical power distribution network is configured to assume the electrical failure mitigating operation mode in such a manner that an electrical fault occurring at an electrical power source or at an electrical load can be isolated, such that plural or all electrical power sources not affected by the electrical fault are enabled to drive plural or all electrical loads not affected by the electrical fault.

5. The electrical power system according to claim 1, wherein the electrical power distribution network comprises plural power lanes of a first kind; wherein each power lane of the first kind has associated at least one associated electrical power source (A; B; C; D), which is not associated to another power lane of the first kind, and wherein each power lane of the first kind has associate at least one electrical load (AA; BB; CC; DD), which is not associated to another power lane of the first kind, such that the at least one associated electrical power source is connected or connectable via the respective power lane of the first kind with the at least one associated electrical load, for enabling the at least one electrical power source to drive the at least one electrical load via the respective power lane of the first kind, without necessarily involving a driving via another power lane of the first kind.

6. The electrical power system according to claim 5, wherein plural power lanes of the first kind are connected or connectable via a connecting lane arrangement of the electrical power distribution network, the connecting lane arrangement comprising one or plural power lanes of a second kind, for enabling load sharing across electrical power sources (A, B, C, D) associated to at least one group of the power lanes of the first kind or associated to all power lanes of the first kind with respect to electrical loads (AA, BB, CC, DD) associated to these power lanes of the first kind, by transmitting power between these power lanes of the first kind via at least one power lane of the second kind.

7. The electrical power system according to claim 5, wherein the power lanes of the first kind each include a power link of a first kind, which allows in its first operational mode the transmission of electrical power via this power link of the first kind from the associated at last one electrical power source (A, B; C; D) to the associated at least one electrical load (AA; BB; CC; DD) and which inhibits in its second operational mode the transmission of electrical power via this power link of the first kind from the associated at last one electrical power source to the associated at least one electrical load; wherein each power link of the first kind preferably is configured to change its operational mode from the first operational mode to the second operational mode, within a tripping time interval of a first order of magnitude in response to at least one preset or pre-settable electrical trip condition which indicates an electrical fault.

8. The electrical power system according to claim 6, wherein the power lanes of the second kind each include a power link of a second kind, which allows in its first operational mode the transmission of electrical power between power lanes of the first kind via this power link of the second kind and which inhibits in its second operational mode the transmission of electrical power between power lanes of the first kind via this power link of the second kind; wherein each power link of the second kind preferably is configured to change its operational mode from the first operational mode to the second operational mode, within a tripping time interval of a second order of magnitude in response to at least one preset or pre-settable electrical trip condition which indicates an electrical fault.

9. The electrical power system according to claim 7, wherein the tripping time interval of the first order of magnitude of the power links of the first kind substantially exceeds the tripping time interval of the second order of magnitude of the power links of the second kind.

10. The electrical power system according to claim 8, wherein each power link of the second kind is provided by an associated Solid-State Power Controller of the electrical power distribution network, which comprises a microcontroller, at least one load channel forming the power link of the second kind, at least one solid-state switch included in the load channel and operable under the control of the microcontroller, wherein the microcontroller is configured to switch the solid-state switch between a conducting state corresponding to the first operational mode of the power link of the second kind and a non-conducting state corresponding to the second operational mode of the power link of the second kind and is configured to monitor at least one current electric condition of the load channel, for responding on the occurrence of an electrical trip condition by switching the solid-state switch from the conducting state to the non-conducting state.

11. The electrical power system according to claim 1, wherein the electrical power distribution network is configured to provide for electric fault isolation by assuming subsequently at least three fault isolation stages when switching from the normal operation mode to the electrical fault mitigating mode in response to the occurrence of an electric fault; wherein a first fault isolation stage provides for segregation of power lane from each other, by at least one power link which switches from its first operational mode to its second operational mode;
  wherein a subsequent second fault isolation stage provides for fault isolation within a power lane still affected by the electric fault, by a power link which switches from its first operational mode to its second operational mode; and
  wherein a subsequent third fault isolation stage provides for partial restoration of load sharing across electrical power sources not affected by the electric fault with respect to electrical loads not affected by the electric fault, by at least one power link which switches from its second operational mode to its first operational mode and is isolated from the electric fault by at least one other power link assuming the second operational mode.

12. An aircraft comprising an electrical power system according to claim 1; wherein the aircraft is at least one of a single pilot aircraft, an aircraft having a vertical take-off and landing capability and an aircraft of the canard type.

13. The aircraft according to claim 12, wherein electrical power system comprises at least one group of electrical loads of a common type in the form of aircraft devices, which are of critical relevance for maintaining a safe flight operation of the aircraft, wherein the aircraft devices are arranged in a number and configuration at one or both of the fuselage of the aircraft and wings of the aircraft to achieve a resiliency against failures, such that various subgroups of the plural aircraft devices each comprising at least two of the aircraft devices of the common type may fail without endangering the flight capability and the controllability of the aircraft.

14. The aircraft according to claim 13, wherein the aircraft devices of the or each respective subgroup are associated to one particular common power lane of the electrical power distribution network of the electrical power system, for being commonly drivable via this common power lane, and wherein the aircraft devices of the or each respective subgroup are provided arranged in a symmetrically distributed manner at one or both of the fuselage of the aircraft and wings of the aircraft, such that an electrical fault which directly or indirectly affects the common power lane and results in a failure of the aircraft devices of this subgroup doesn't endanger the flight capability and the controllability of the aircraft.

\* \* \* \* \*